(12) United States Patent
Bae et al.

(10) Patent No.: US 8,220,981 B2
(45) Date of Patent: Jul. 17, 2012

(54) LIQUID CRYSTAL DISPLAY HAVING A PLURALITY OF MODULES

(75) Inventors: Seung Choon Bae, Suwon-si (KR); Seung Se Kim, Yongin-si (KR); Hoon Hur, Seoul (KR)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 12/632,694

(22) Filed: Dec. 7, 2009

(65) Prior Publication Data

US 2010/0165236 A1 Jul. 1, 2010

Related U.S. Application Data

(63) Continuation-in-part of application No. 12/618,603, filed on Nov. 13, 2009, now Pat. No. 8,113,704, which is a continuation of application No. 12/453,885, filed on May 26, 2009, which is a continuation-in-part of application No. 12/453,885, filed on May 26, 2009.

(30) Foreign Application Priority Data

| May 27, 2008 | (KR) | 10-2008-0049146 |
| Jun. 27, 2008 | (KR) | 10-2008-0061487 |
| Oct. 10, 2008 | (KR) | 10-2008-0099569 |
| Apr. 22, 2009 | (KR) | 10-2009-0035029 |

(51) Int. Cl.
*F21V 7/04* (2006.01)
*G02F 1/1335* (2006.01)

(52) U.S. Cl. ......... 362/613; 362/612; 349/61; 349/65; 349/67

(58) Field of Classification Search .......... 349/58, 349/61, 65, 67; 362/632–634, 612–613
See application file for complete search history.

(56) References Cited

U.S. PATENT DOCUMENTS

| 5,704,703 A | 1/1998 | Yamada et al. |
| 5,717,422 A | 2/1998 | Fergason |
| 6,011,602 A | 1/2000 | Miyashita et al. |
| 6,241,358 B1 | 6/2001 | Higuchi et al. |
| 6,456,343 B2 | 9/2002 | Kim et al. |

(Continued)

FOREIGN PATENT DOCUMENTS

EP 0 987 490 5/2010

(Continued)

OTHER PUBLICATIONS

Office Action dated Feb. 17, 2011 for U.S. Appl. No. 12/618,603.

(Continued)

*Primary Examiner* — Nathanael R Briggs
(74) *Attorney, Agent, or Firm* — KED & Associates, LLP

(57) ABSTRACT

An LED backlight unit and an LCD using a backlight unit may be provided. A liquid crystal display (LCD) may include a plurality of modules including a circuit board, a plurality of light emitting diode (LED) light sources arranged on the circuit board for emitting light, and a light guide plate having a light incidence part including an incident surface for receiving light emitted from the LED light source and a light emission part for emitting the light. The LCD may further include a frame having the plurality of the modules provided thereon, and at least one driving unit on one surface of the frame, wherein a connection hole is formed in the frame to connect the circuit board to the at least one driving unit.

30 Claims, 29 Drawing Sheets

U.S. PATENT DOCUMENTS

| | | |
|---|---|---|
| 6,816,141 B1 | 11/2004 | Fergason |
| 7,125,152 B2 | 10/2006 | Lin et al. |
| 7,311,431 B2 | 12/2007 | Chew et al. |
| 7,312,838 B2 | 12/2007 | Hwang et al. |
| 7,413,330 B2 | 8/2008 | Furukawa |
| 7,641,375 B2 | 1/2010 | Fujita et al. |
| 8,113,704 B2 | 2/2012 | Bae et al. ............. 362/613 |
| 2001/0017774 A1 | 8/2001 | Ito |
| 2003/0206253 A1 | 11/2003 | Cho |
| 2005/0248939 A1 | 11/2005 | Li et al. |
| 2005/0276075 A1 | 12/2005 | Chen et al. |
| 2006/0044830 A1 | 3/2006 | Inoue et al. ........... 362/614 |
| 2006/0114690 A1 | 6/2006 | Iki et al. ............... 362/612 |
| 2006/0209564 A1 | 9/2006 | Lin et al. |
| 2006/0221638 A1 | 10/2006 | Chew et al. |
| 2006/0239033 A1 | 10/2006 | Jung et al. ............ 362/612 |
| 2006/0245213 A1 | 11/2006 | Beil et al. ............. 362/616 |
| 2007/0019419 A1* | 1/2007 | Hafuka et al. ........ 362/373 |
| 2007/0058390 A1 | 3/2007 | Sugawara et al. ..... 356/560 |
| 2007/0076434 A1 | 4/2007 | Uehara et al. ........ 362/616 |
| 2007/0247869 A1 | 10/2007 | Lang et al. |
| 2007/0247871 A1* | 10/2007 | Yoo .................... 362/612 |
| 2008/0205080 A1 | 8/2008 | Erchak et al. |
| 2011/0051045 A1 | 3/2011 | Hur et al. |

FOREIGN PATENT DOCUMENTS

| | | |
|---|---|---|
| JP | 64029708 | 2/1989 |
| JP | 01-261692 | 10/1989 |
| JP | 08-160425 | 6/1996 |
| JP | 09-171111 A | 6/1997 |
| JP | 09-186825 | 7/1997 |
| JP | 09-292531 | 11/1997 |
| JP | 11-288611 | 10/1999 |
| JP | 2002-228844 A | 8/2002 |
| JP | 2004-206916 | 7/2004 |
| JP | 2005-259361 | 9/2005 |
| JP | 2005-259361 A | 9/2005 |
| JP | 2005-317480 | 11/2005 |
| JP | 2006-054410 A | 2/2006 |
| JP | 2006-108033 | 4/2006 |
| JP | 2006-0134748 | 5/2006 |
| JP | 2006-269364 A | 10/2006 |
| JP | 2006-286638 | 10/2006 |
| JP | 2007-250197 A | 9/2007 |
| JP | 2007-250979 A | 9/2007 |
| JP | 2007-265837 A | 10/2007 |
| JP | 2007-293339 | 11/2007 |
| JP | 2007-293339 A | 11/2007 |
| JP | 2008-108622 | 5/2008 |
| JP | 2008-108623 | 5/2008 |
| JP | 2008-108623 A | 5/2008 |
| JP | 2008/192395 | 8/2008 |
| JP | 2008-192395 | 8/2008 |
| JP | 2009-054990 A | 3/2009 |
| KR | 2001-0012532 | 2/2001 |
| KR | 10-2001-0085460 A | 9/2001 |
| KR | 10-2003-016631 | 3/2003 |
| KR | 10-2005-0067858 | 7/2005 |
| KR | 10-2005-0067903 | 7/2005 |
| KR | 10-2005-0112661 A | 12/2005 |
| KR | 10-2006-0106774 | 10/2006 |
| KR | 10-2007-0001657 | 1/2007 |
| KR | 10-2007-0002920 A | 1/2007 |
| KR | 10-2007-0029365 A | 3/2007 |
| KR | 10-2007-0104149 A | 10/2007 |
| KR | 10-2008-0070214 A | 7/2008 |
| KR | 10-2008-0078210 A | 8/2008 |
| KR | 10-2009-0022350 A | 3/2009 |
| KR | 10-2009-0040673 A | 4/2009 |
| KR | 10-2009-0109766 A | 10/2009 |
| WO | WO 2009/017067 | 2/2009 |
| WO | WO 2010/038516 | 4/2010 |

OTHER PUBLICATIONS

Office Action dated May 25, 2011 from U.S. Appl. No. 12/453,885.
International Search Report dated Jan. 8, 2010.
PCT International Search Report dated Oct. 27, 2010 issued in Application No. PCT/KR2010/001492.
PCT International Search Report dated Oct. 29, 2010 issued in Application No. PCT/KR2010/001485.
Korean Office Action dated Dec. 21, 2010 issued in Application No. 10-2008-0049146.
Korean Office Action dated Dec. 21, 2010 issued in Application No. 10-2008-0099569.
PCT International Search Report dated Sep. 30, 2010 issued in Application No. PCT/KR2010/001067.
PCT International Search Report dated Sep. 30, 2010 issued in Application No. PCT/KR2010/001420.
Office Action dated Sep. 7, 2010 from U.S. Appl. No. 12/618,603.
Korean Notice of Allowance for Application No. 10-2008-0049146 dated Nov. 30, 2011 and English translation.
Korean Office Action dated Feb. 22, 2010.
Korean Notice of Allowance dated Aug. 30, 2011 for Application No. 10-2008-0049146 (English translation).
European Search Report dated Aug. 30, 2011 for Application No. 09 75 5013.
U.S. Office Action dated Oct. 25, 2011 for U.S. Appl. No. 12/727,966.
PCT Search Report and Written Opinion dated Jun. 23, 2010.
European Search Report for Application 10015492.1 dated Apr. 26, 2011.
Search Report dated Oct. 28, 2010 for Application No. PCT/KR2010/010422.
Search Report dated Oct. 28, 2010 for Application No. PCT/KR2010/010423.
Search Report dated Oct. 28, 2010 for Application No. PCT/KR2010/010424.
Search Report dated Oct. 28, 2010 for Application No. PCT/KR2010/010425.
Korean Office Action dated Apr. 9, 2010 for Application No. 10-2009-0113708.
Korean Office Action dated Oct. 11, 2010 for Application No. 10-2009-0053260.
International Search Report dated Oct. 27, 2010 for Application No. PCT/KR2010/001963.
Office Action dated Nov. 3, 2011 for U.S. Appl. No. 12/453,885.
Notice of Allowance dated Apr. 4, 2012 for U.S. Appl. No. 12/768,982.

* cited by examiner

LIQUID CRYSTAL DISPLAY HAVING A PLURALITY OF MODULES

This application is a continuation-in-part of U.S. application Ser. No. 12/618,603, filed Nov. 13, 2009, now U.S. Pat. No. 8,113,704 which is a continuation of U.S. application Ser. No. 12/453,885, filed May 26, 2009, the subject matters of which are incorporated herein by reference. This application is a continuation-in-part of U.S. application Ser. No. 12/453,885, filed May 26, 2009. This application, U.S. application Ser. Nos. 12/618,603 and 12/453,885 claim priority and benefit of the Korean Patent Application No. 10-2008-0049146, filed May 27, 2008, Korean Patent Application No. 10-2008-0061487, filed Jun. 27, 2008, Korean Patent Application No. 10-2008-0099569, filed Oct. 10, 2008, and Korean Patent Application No. 10-2009-0035029, filed Apr. 22, 2009, the subject matters of which are hereby incorporated by reference.

BACKGROUND

1. Field

Embodiments of the present invention may relate to a liquid crystal display device.

2. Background

Display devices such as Liquid Crystal Display (LCD) devices have various applications, such as television sets, laptop computers, monitors for desk top computers, and cellular phones.

Since the LCD can not emit a light for itself, in order to display image information, a light emitting device (LED) may be used for illumination of a liquid crystal display panel.

Since the light emitting device for the LCD is coupled to a back side of the liquid crystal display panel, the light emitting device may be called a backlight unit that forms a facial light source for providing a light to the liquid crystal display panel.

A backlight unit may include a light source, a light plate, diffusion sheets, a prism, a protective sheet, and/or so on. As the light source, fluorescent lamps, such as mercury cold cathode fluorescent lamps, light emitting diodes, or the like can be used.

SUMMARY OF THE DISCLOSURE

Embodiments of the present invention may relate to a liquid crystal display device.

A liquid crystal display (LCD) may include a liquid crystal display (LCD) comprising: a plurality of modules comprising a circuit board, a plurality of light emitting diode (LED) light sources arranged on the circuit board for emitting light, with an orientation angle with respect to a predetermined direction, and a light guide plate comprising a light incidence part including an incident surface for receiving light emitted from the LED light source and a light emission part for emitting the light upward, respectively; a frame having the plurality of the modules arranged thereon; at least one driving unit arranged on a rear surface of the frame, wherein a connection hole is formed in the frame to connect the circuit board to the driving unit.

A LCD may also include a plurality of modules comprising a circuit board, a plurality of LED light sources arranged on the circuit board for emitting light, with an orientation angle with respect to a predetermined direction, and a light guide plate comprising a light incidence part including an incident surface for receiving light emitted from the LED light source and a light emission part for emitting the light upward, respectively. The LCD may also include a frame having the plurality of the modules arranged thereon, and at least one driving unit arranged on a rear surface of the frame, wherein a plurality of connection holes for connecting the circuit board to the driving unit electrically and a plurality of recess parts for seating the circuit board therein are formed in the frame.

BRIEF DESCRIPTION OF THE DRAWINGS

Embodiments and arrangements may be described in detail with reference to the following drawings in which like reference numerals refer to like elements and wherein.

DETAILED DESCRIPTION

Figure 1:
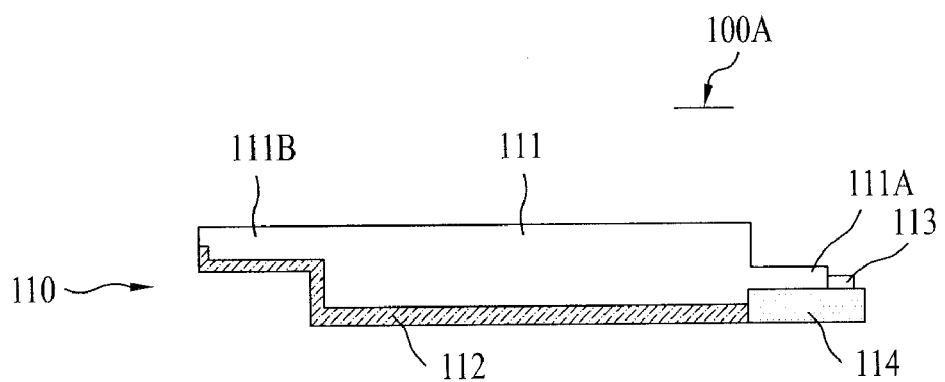
FIG. 1 illustrates a side view of a backlight unit in accordance with a first preferred embodiment of the present invention.

Reference may now be made in detail to the specific embodiments of the present invention, examples of which are illustrated in the accompanying drawings. Wherever possible, the same reference numbers will be used throughout the drawings to refer to the same or like parts.

The terms "module", "portion", and "part" on elements of embodiments of the present invention used in description hereafter are ones given or used together with others only taking easiness of writing the specification into account, and are not distinctive in definitions between themselves, or in functions.

In a case it is described that an element, like a layer, a region, or a substrate, is "on" other element, it is understandable that the element is on the other element directly, or there may be another intermediate element between the two elements.

It will be understood that the words intend to include other directions in addition to a direction described in the drawings. Finally, the word of 'directly' means that there is no other element disposed inbetween. The words of 'and/or' as is used herein include one or more than one or all combinations of written items.

It will be also understood that although the terms first, second, and so forth are used herein to describe various regions, layers and/or sections, these regions, layers and/or sections may not be limited by these terms.

<A First Embodiment>

Figure 2:
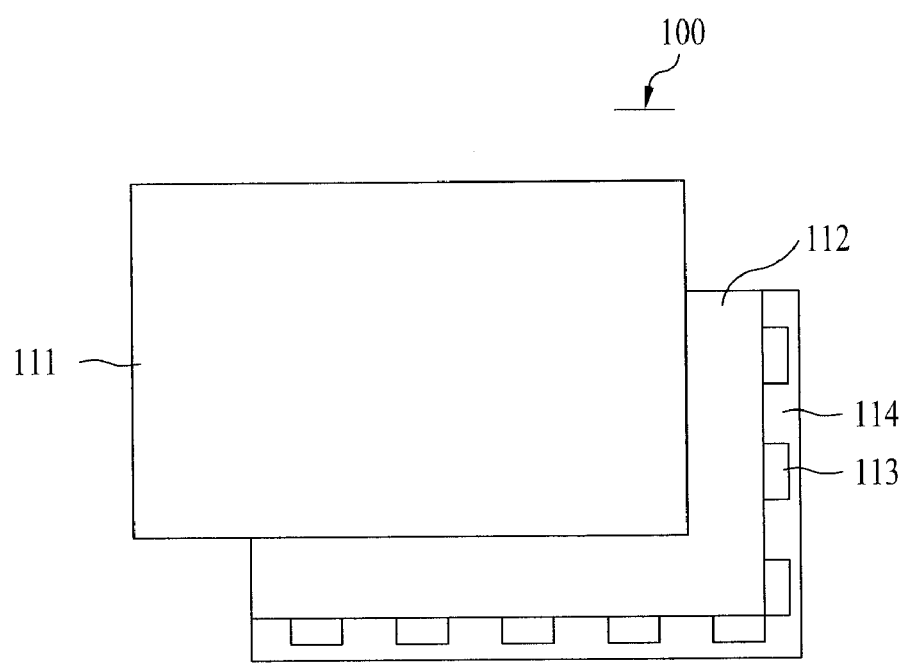
FIG. 2 illustrates an exploded view of the backlight unit in FIG. 1.

FIG. 1 illustrates a side view of a backlight unit in accordance with a first preferred embodiment of the present invention, and FIG. 2 illustrates an exploded view of the backlight unit in FIG. 1.

As shown in FIGS. 1 and 2, the backlight unit 100A includes a light guide plate 111, a reflection plate 112 on an underside of the light guide plate 111, and a light source 113. The light source 113, the light guide plate 111 and the reflection plate 112 may together be called a light guide part 110 (or light guide portion), a LED backlight module 110 and/or a module 110.

A unit including the light guide part 110, the LED backlight module 110 and/or the module 110 may be referred to as an LED backlight unit (or LED backlight).

Light emitting diodes (LEDs) may be used as the light source 113. The light guide plate 111 may include a light incidence part 111A formed at a portion of the light guide plate 111 where a light is incident thereto from the LED 113, and the other side (opposite to the light incidence part 111A) edge 111B which is stepped (or raised).

Referring to FIGS. 1 and 2, the light incidence part 111A is projected from the light guide plate 111 in a side direction, and, if the light incidence part 111A is projected from the light guide plate 111 in the side direction, the light source 113 can be arranged at an edge of the light incidence part 111A on the circuit board 114.

The reflection plate 112 on the light guide plate 111 is on the underside of the light guide plate 111 and an underside of the other edge 111B of the light incidence part 111A. Additionally, the reflection plate 112 may cover (or overlap) sides of the light guide plate 111.

The light source 113 and the circuit board 114 may be positioned on a first side which is a light incidence part 111A side of the light guide plate 111, or on the first side and a second side that is substantially perpendicular to the first side such that the light is incident to the light guide plate 111 from the LED 113 in two directions.

Figure 3:
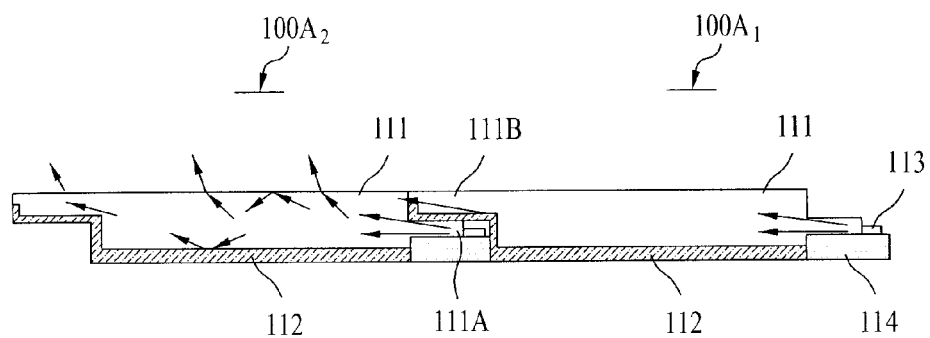
FIG. 3 illustrates a side view of an assembly of a backlight unit in accordance with a first preferred embodiment of the present invention.
Figure 4:
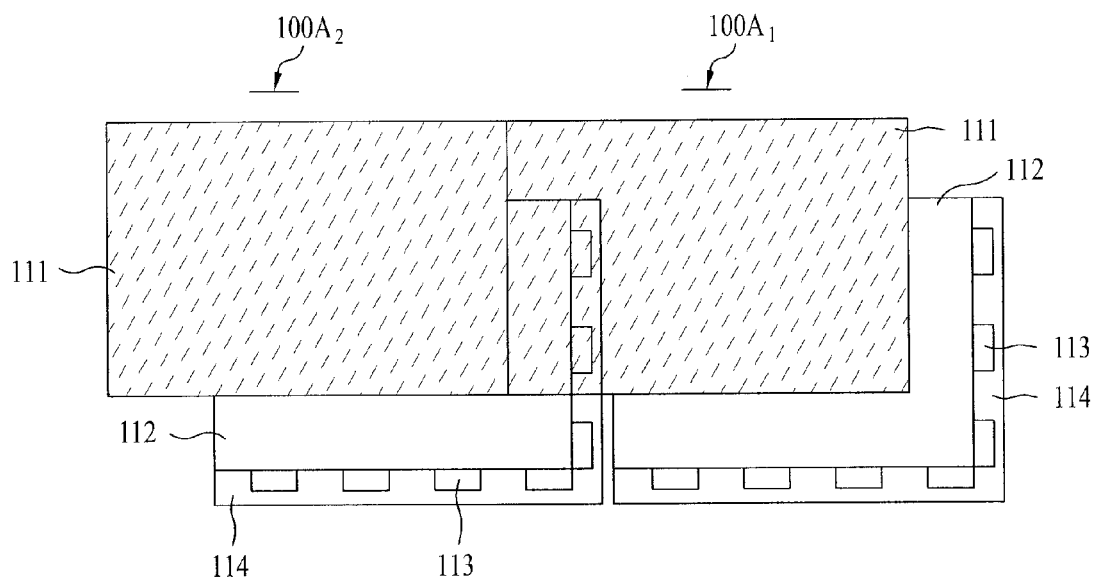
FIG. 4 illustrates an exploded view of the assembly of the backlight unit in FIG. 3.

A plurality of the light guide parts 110 (or light guide portions) each including the light guide plate 111 and the reflection plate 112 shown in FIGS. 1 and 2 may be arranged as shown in FIGS. 3 and 4 to form a full set of a backlight unit 100A₁ or 100A₂.

For convenience's sake, referring to FIGS. 3 and 4, a right side backlight unit 100A may be called as a first module $A_1$, and a left side backlight unit 100A may be called a second module $A_2$.

Referring to FIGS. 3 and 4, the first module 100A₁ and the second module 100A₂ may be coupled such that the other edge 111B opposite to the light incidence part of the first module $A_1$ covers (or overlaps) the light incidence part 111A of the second module $A_2$.

This may prevent the light from the LED 113 at the light incidence part 111A of the first module 100A₁ from leaking to an outside of the backlight unit.

By arranging the other edge 111B of the first module 100A₁ coupled to the light incidence part 111A of the second module 100A₂, a function of the light guide plate 111 as well as a function of covering (or overlapping) the LED 113 of the second module 100A₂ may be performed. That is, the light from the LED 113 of the second module 100A₂ may not be exposed, directly.

In the above configuration, light from the second module 100A₂ may advance along a side of the light guide plate 111 of the second module $A_2$, and may uniformly come out of an outside surface of the light guide plate 111.

The reflection plate 112 of the second module 100A₂ can improve light efficiency of the light that comes out of (or is output from) the outside surface of the light guide plate 111. That is, the light from the LED 113 of the second module $A_2$ may advance along the side of the light guide plate 111A, and the reflection plate 112 of the first module 100A₁ over the light incidence part 111A adjacent to the light incidence part 111A assists such advance of the light.

By arranging the backlight units 100A each having the light guide plate 111 and the reflection plate 112 of the first embodiment in a tiling fashion, a large sized backlight unit 100A can be fabricated, which can be used in TV sets, sign boards with lamps, and so on.

Thus, by projecting the light incidence part 111A from a light forwarding surface extensively, relatively dark portions shown on a portion caused by gaps between each of the LEDs 113 may be decreased and direct leakage of the light from the LEDs 113 through connected portion between each of the light guide plates 111 can be prevented and/or substantially reduced.

Though the light can transmit from one light guide plate 111 to an adjacent light guide plate 111 through the other edge 111B of the light incidence part 111A, by not placing the reflection plate 112 between the adjacent light guide plates 111 to shield the light transmission completely, but by permitting the light to transmit through the adjacent light guide plates 111, formation of the relatively dark portions (shadow images) caused by a step (or raised portion) between the light incidence part 111A and the adjacent edge 111B (or opposite edge part) of the light guide plate 111 can be prevented and/or substantially reduced.

Figure 5:
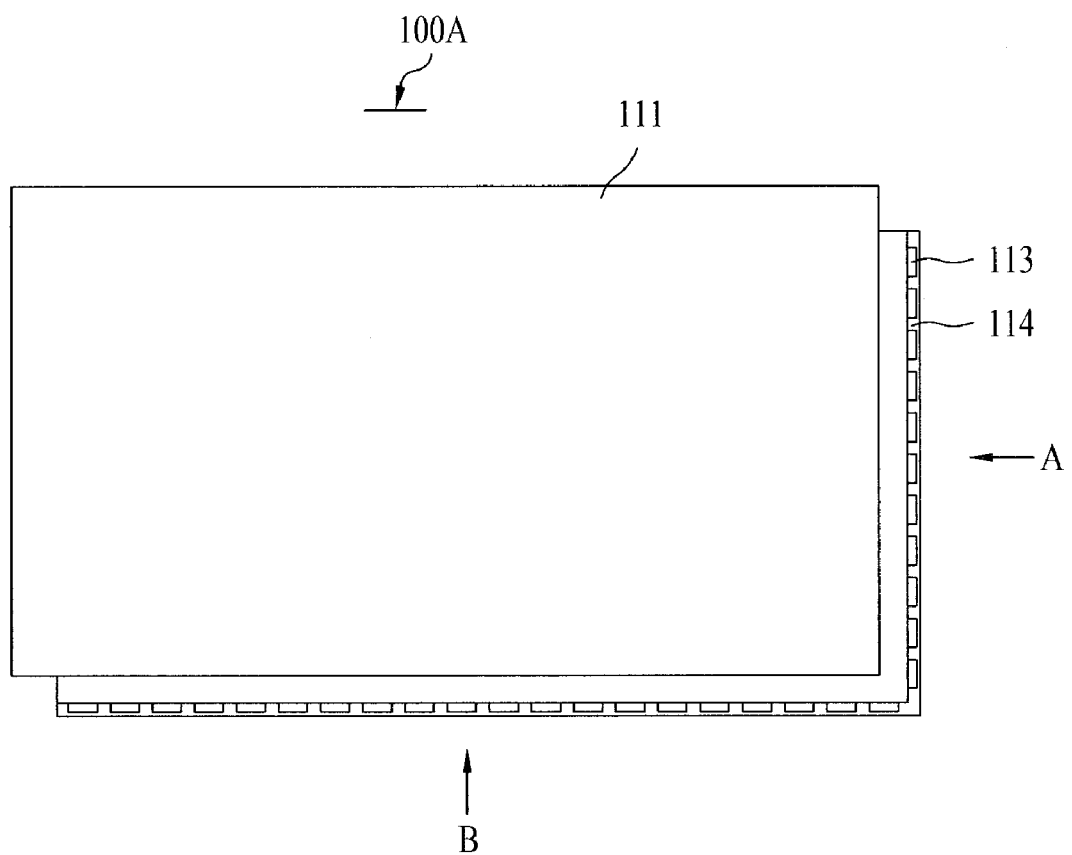
FIG. 5 illustrates an exploded view of a backlight unit in accordance with a first preferred embodiment of the present invention.
Figure 6:
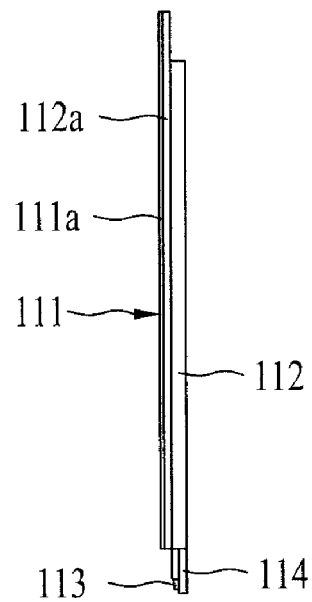
FIG. 6 illustrates a side view of the backlight unit in FIG. 5 seen from A.
Figure 7:
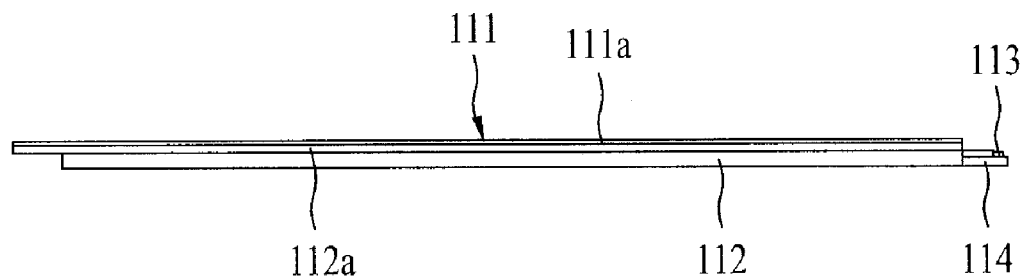
FIG. 7 illustrates a side view of the backlight unit in FIG. 5 seen from B.

FIGS. 5 to 7 illustrate the backlight unit in more detail, each showing a state in which the LED 113 on the circuit board 114 is in contact with the light guide plate 111.

Figure 8:
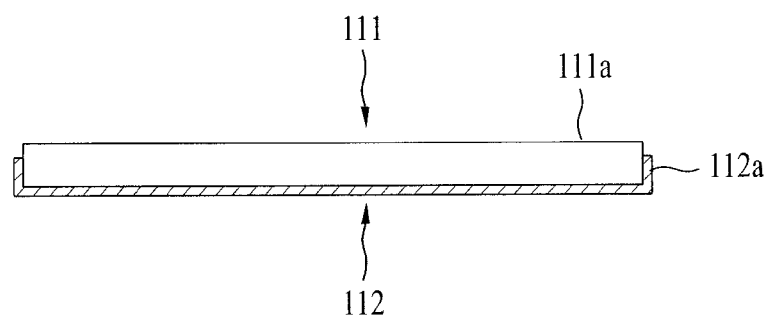
FIG. 8 illustrates a section of a light guide portion.

Referring to FIGS. 6 and 7, the reflection plate 112 is arranged, not only on an underside of the light guide plate 111, but also on sides of light guide plate 111 as a rim 112a of the reflection plate 112 such that a portion of the light guide plate 111 is exposed and a rest of the light guide plate 111 is covered (or overlapped) by the rim 112a. That is, a section as shown in FIG. 8 may be made.

Alternatively, the reflection plate 112 may be folded at the sides of the light guide plate 111 more than one time.

Figure 9:
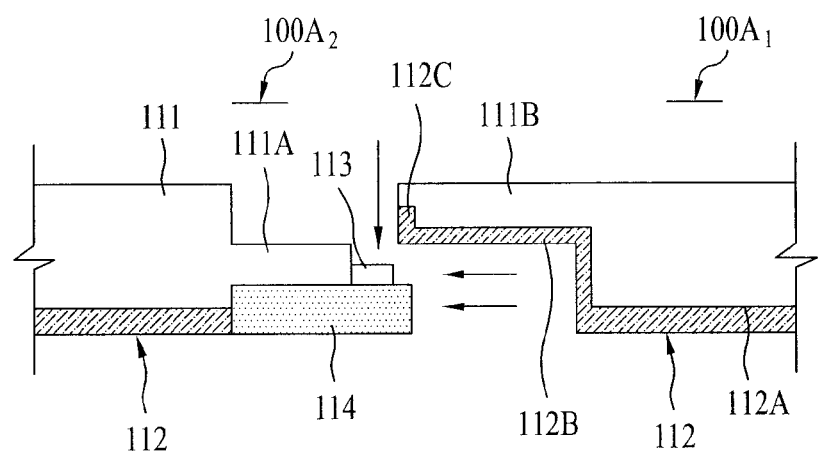
FIGS. 9 and 10 illustrate coupling of a light guide portion in accordance with a first preferred embodiment of the present invention.
Figure 10:
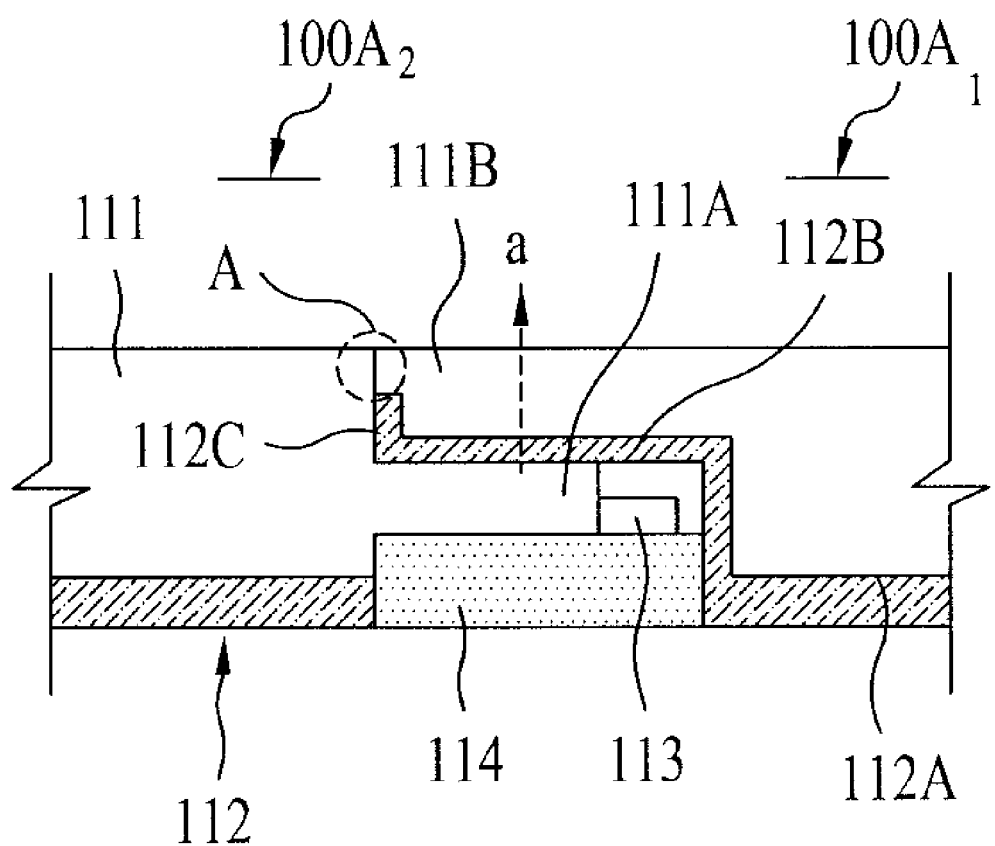

Coupling to the modules $100A_1$ and $100A_2$ can be made as shown in FIGS. 9 and 10.

That is, in a state the LED 113 of the second module $A_2$ is coupled to the light incidence part 111A of the light guide plate 111 with the LED 113 in contact with the light incidence part 111A, the edge 111B of the first module $A_1$ is coupled to the light incidence part 111A of the second module $A_2$ adjacent thereto.

According to this, the edge 111B of the first module $100A_1$ having the reflection plate 112 attached thereto is positioned over the LED 113 of the second module $A_2$, such that the light from the LED 113 of the second module $A_2$ is not exposed to an upper side, but incident on the light incidence part 111A, transmits through the light guide plate 111 and comes out of (or is emitted from) the light guide plate 111.

The reflection plate 112B on the underside of the other edge of the light incidence part 111A and an edge 112C of the reflection plate 112B extended therefrom can optically shield at least a portion of the light guide plate 111.

In other words, though the first module $A_1$ and the second module $A_2$ are coupled together optically, enabling the light to transmit from the second module $100A_2$ to the first module $A_1$, and vice versa, a portion of the light can be shielded.

That is, a portion of the light from the second module $A_2$ to the edge 111B of the first module $A_1$ can be shielded by the edge 112c of the reflection plate of the first module $100A_1$, at least preventing a brighter line from forming at a boundary of the first and second modules $A_1$ and $A_2$. However, adjacent modules may be made to be connected with a connection portion A over the edge 112c of the reflection plate optically, formation of a relatively dark line can be prevented and/or decreased.

Figure 11:
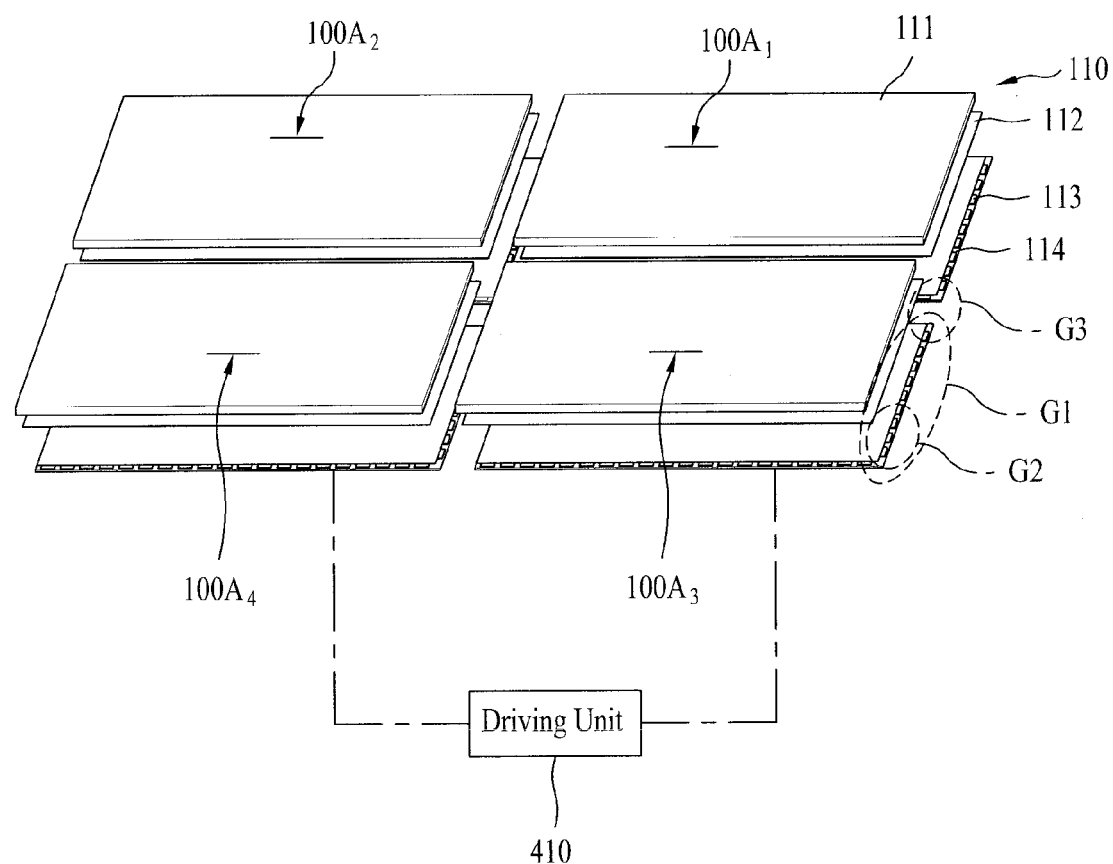
FIG. 11 illustrates an exploded perspective view showing coupling of backlight unit modules in accordance with a first preferred embodiment of the present invention.

Referring to FIG. 11, by arranging a plurality of the modules $100A_1$, $100A_2$, $100A_3$, and $100A_4$ each having the light guide plate 111 and the reflection plate 112, a set of backlight units 100A can be fabricated.

The circuit board 114 and the LEDs 113 may be arranged on one or two sides of the light guide portion 110, and a plurality of the modules $100A_1$, $100A_2$, $100A_3$, and $100A_4$ each having the light guide plate 111 and the reflection plate 112, to fabricate a set of backlight units 100A.

The backlight unit 100A having the plurality of the modules $100A_1$, $100A_2$, $100A_3$, and $100A_4$ or the plurality of the LEDs connected thereto may be driven by a driving unit 410 (or controller) independently or in groups with the backlight unit 100A divided into groups of a predefined number of LEDs, and thereby enabling to significantly reduce power consumption.

That is, the driving unit 410 may independently control the brightness of the light source (LEDs) 113 of each of the light guide parts 110 (or light guide portions).

That is, the circuit board of the light source forming each of the LED backlight modules $100A_1$, $100A_2$, $100A_3$ and $100A_4$ may be controlled independently, in other words, dividedly driven or each of the LEDs mounted on a single circuit board may be dividedly driven.

A unit set of an entire LED set defining a single side of each module may be grouped to a unit group and driven to this group unit. A predetermined number of LEDS forming a single side of each module may be grouped to a sub-group set and driven to this sub-group unit.

The divided operation may enable a larger contrast ratio and may reduce electricity consumption.

The brightness of the light source 113 of each of the light guide parts 110 may be controlled according to image data associated with the light source 113. The image data is in relation to images displayed on a display panel, such as a liquid crystal display panel. For example, if the image data has dark images, a group of light sources 113 in relation to the dark images can be turned out or dimmed, and if the image data has bright images, a group of light sources 113 in relation to the bright images can be driven more brightly. As a result, the contrast ratio of the images may be increased and/or improved.

In this instance, the unit of driving by the driving unit 410 (or controller) may be a set of all LEDs in an individual module, an individual LED, or a set of LEDs grouped within each of the module (logical group).

That is, the LEDs may be driven as a group of all LEDs set G1 located along a side of each module, or as a sub group of LED set G2 within the set G1. The unit may be a logical group G3 (as a unit of driving) that comprises LEDs (or an LED) located in a module $100A_1$ and LEDs (or an LED) located in the adjacent module $100A_2$.

In other words, the light source 113 of the light guide part 110 (or light guide portion) includes groups (G1, G2, or G3) of LEDs, and the driving unit 410 independently controls brightness of each group of the LEDs 113.

Thus, as described, in the backlight unit in accordance with the first embodiment, small sized light guide plates are formed, and the LEDs are attached to a side of each of the light guide plates, for securing a light quantity and dispersing heat, and particularly, LEDs at the side of the light guide plate can be optically hidden.

Moreover, the backlight unit in accordance with the first embodiment may to arrange the LEDs between the light guide plates as an entire area of the display can be covered (or overlapped) with the small sized light guide plate modules, and use the same light guide plate regardless of a size of the display.

In the meantime, fabrication of the large sized display by connecting the light guide plates fabricated as modules piece by piece in a tiling fashion enables to standardize parts since the same part can be applied to various sized TV sets by only varying a number of modules.

<A Second Embodiment>

Figure 12:
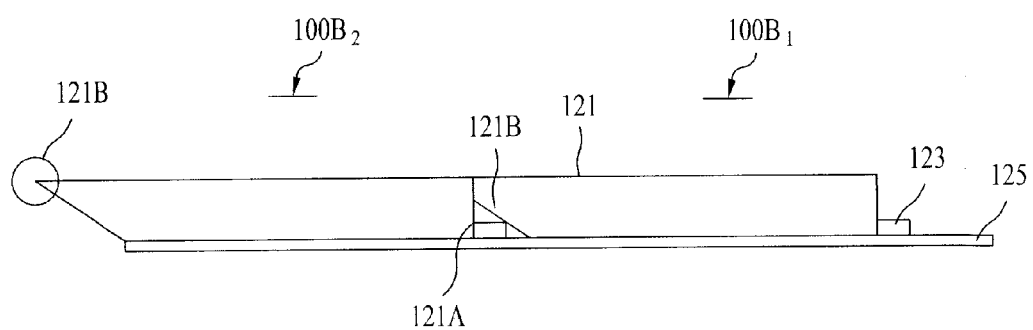
FIG. 12 illustrates a side view of a backlight unit in accordance with a second preferred embodiment of the present invention.

Referring to FIG. 12, the backlight unit 100B in accordance with a second preferred embodiment of the present invention may include a light guide plate 121, a back panel (or a frame) 125 under the light guide plate 121 and a light source 123.

A plurality of modules $100B_1$ and $100B_2$ each having the light guide plate 121 of the second embodiment are arranged on a plane to form a full set of the backlight unit 100B.

For convenience sake, a right side module 100B may be called a first module $100B_1$, and a left side module 100B may be called a second module $100B_2$.

That is, a back light portion 121B of the light guide plate 121 of the first module $100B_1$ is coupled to a light incidence part 121A of the second module $100B_2$ adjacent thereto in a position of covering (or overlapping) the light incidence part 121A. This may prevent the light from the LED 123 at the light incidence part 121A of the second module $100B_2$ adjacent thereto from leaking to an outside of the backlight unit.

In order to connect the light guide plate 121 of the first module $100B_1$ and light guide plate 121 of the second module $100B_2$ adjacent thereto in a tiling fashion, the LED 123 may be located on a lower side of a connection portion (i.e., on a lower side of an edge 121B of the light guide plate 121).

Therefore, it is provided to secure a space for placing the LED 123, which may be selected according to optical characteristics of a structure of the light guide plate 121.

That is, referring to FIG. 12, different from the first embodiment, the edge 121B of the light guide plate 121 may be triangular, and the LED 123 may be provided on the lower side of the edge 121B. In this instance, instead of a separate circuit board, the light guide plate 121 and the LED 123 may be mounted to one frame 125 having circuits formed thereon.

Parts not explained herein may be identical or similar to the first embodiment.

<A Third Embodiment>

Figure 13:
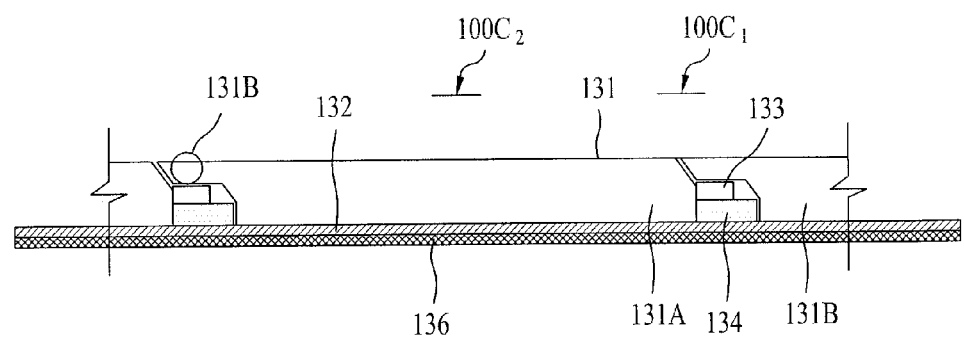
FIG. 13 illustrates a side view of a backlight unit in accordance with a third preferred embodiment of the present invention.

Referring to FIG. 13, a backlight unit 100D in accordance with a third preferred embodiment of the present invention may include a light source portion 130 having a light guide plate 131 and a reflection plate 132 on an underside of the light guide plate 131, a light source 133, and a circuit board 134 having the light source 133 mounted thereto.

Referring to FIG. 13, there are a plurality of modules 100C$_1$ and 100C$_2$ each having the light guide plate 131 arranged on a plane to form a full set of a backlight unit 100C.

Referring to FIG. 13, for convenience's sake, a right side backlight unit 100C may be called a first backlight unit 100C$_1$ and a left side backlight unit 100C may be called a second backlight unit 100C$_2$.

In order to connect the light guide plate 131 of the first backlight unit 100C$_1$ to the light guide plate 131 of the second module 100C$_2$ in a tiling fashion, the LED 133 may be located on a lower side of a connection portion (i.e., on a lower side of the edge 131B).

According to this, it is provided to secure a space for providing the LED 133 therein, by selecting the space according to optical characteristic of a structure of the light guide plate 131.

The structure may have a sloped back light portion 131B of the first module 100C$_1$ in contact with the second module C$_2$. In this instance, the LED 133 is mounted to a separate circuit board, and the reflection plate 132 and the frame 136 may be positioned under the light guide plate 131.

As shown in FIG. 13, the plurality of light guide plates 131 may be provided on a single reflection plate, and not on separate reflection plates corresponding to the light guide plates 131.

Thus, the LED backlight unit mounted to the LCD according to this embodiment may include X (X>1) circuit boards, a light source including a plurality of LED light sources 133 arranged on the circuit boards 134, K (K=1, 2, 3, N) light guide plates 131 having a first side surface for receiving light emitted from the LEDs 133 thereon and a second side surface facing the first side surface, and P reflection plates 132 provided under the light guide plates 131. At least one of the P (N>P>=1) reflection plates 132 may have the plurality of the light guide plates 131 arranged thereon.

The number (N) of the light guide plates 131 may be less than the number (P) of the reflection plates 132. As a result, the plurality light guide plates 131 may be arranged on at least one reflection plate 132.

<A Fourth Embodiment>

Referring to FIGS. 14 to 17, the backlight unit 100D in accordance with a fourth preferred embodiment of the present invention may include a light guide plate 141, a light source 143, and a reflection plate 144. Parts unexplained herein may have identical or similar elements or parts as in foregoing embodiments, and therefore may not be further explained.

The light guide plate 141 and the reflection plate 144 may together be called a light guide portion 140 (or light guide part) and/or a light guide plate module 140.

The light guide plate 141 may have a flat upper side, a sloped lower surface, and a side having a light incidence part 142 formed thereon.

The light guide plate 141 may have an opposite first side 141a and a second side 141b, and an opposite third side 141c and fourth side 141d. The third side 141c and the fourth side 141d are sides substantially perpendicular to the light incidence part 142. The light guide plate 141 has an underside surface 141f spaced from or in contact with a light forwarding surface 141e and the reflection plate 144.

The light guide plate 141 may have a thickness that becomes thinner from the first side 141a to the second side 141b, forming the underside of the light guide plate 141 to be sloped, partially or entirely.

The light incidence part 142 at the first side 141a of the light guide plate 141 may have a thickness thinner than a thickness of the first side 141a of the light guide plate 141. According to this, an upper side of the light incidence part 142 and an upper side 141e of the light guide plate 141 may be positioned on planes different from each other.

In order to transmit the light sufficiently uniformly throughout the light guide plate 141, a portion of a lower side of the light incidence part 142 may be formed unevenly.

An upper side of the circuit board 143b of the light source 143 coupled to the underside of the light incidence part 142 may also be formed unevenly at the same position.

The reflection plate 144 may have a rim 147 substantially perpendicular to the light source 143, which may be coupled to at least a portion of the third side 141c and the fourth side 141d of the light guide plate 141.

The light guide plate 141 may have at least one fastening protrusion 145 protruding from an underside periphery as a fastening member for fastening to an upper side 144a of the reflection plate 144.

The fastening protrusion 145 may be placed in a fastening recess 144e in the upper side of the reflection plate 144 for maintaining a position even against an external impact and/or vibration.

As a member for fastening the light guide plate 141 to the reflection plate 144, the light guide plate 141 may have a supplementary (or auxiliary) protrusion 145a from the second side 141b and the reflection plate 144 may have a cut-off portion 144g formed in conformity with the supplementary protrusion 145a.

The light source 143, positioned at a side of the light incidence part 142 for emitting a light to the light incidence part 142, may include at least one LED 143a and a circuit board 143b.

The LED 143a is positioned at a side of the light incidence part 142 for generating and emitting the light to the light incidence part 142. The circuit board 143b may be coupled to and support undersides of the LED 143a and the light incidence part 142.

By projecting the light incidence part 142 from the side of the light guide plate 141, relatively dark portions between the LEDs 143a can be eliminated or decreased, and direct leakage of the light through connection portion between modules 100D may be prevented.

The reflection plate 144 may be coupled to the underside 141f of the light guide plate 141 for reflection of the light to the light guide plate 141, and may cover (or overlap) at least a portion of the second to fourth sides 141b, 141c, and 141d of the light guide plate 141 for preventing the light from transmitting to an outside of the backlight unit or an adjacent light guide plate from the light guide plate 141 at least partially.

Figure 16:
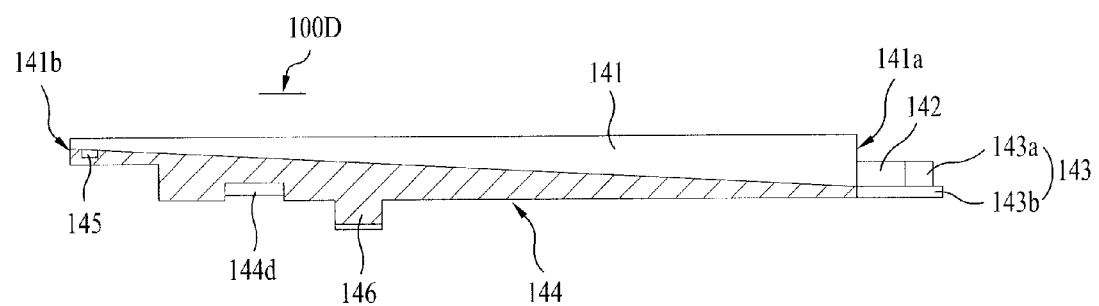
Figure 17:
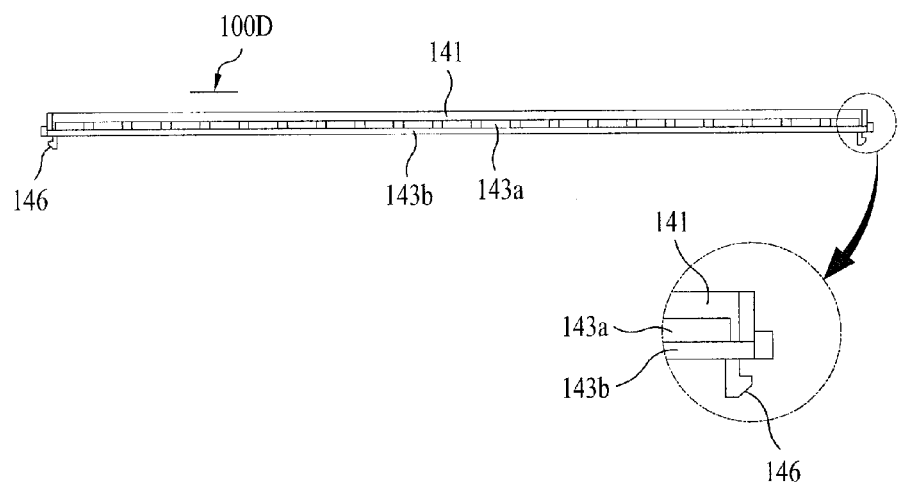

Referring to FIG. 16, an upper side 144a of the reflection plate 144 may have a slope opposite to the slope of the underside 141f of the light guide plate 141.

Accordingly, if the reflection plate 144 is provided on the light guide plate 141 such that the upper side 144a of the reflection plate 144 couples to the underside 141f of the light guide plate 141, the underside of the reflection plate 144 and the upper side 141e of the light guide plate 141 are parallel to each other.

That is, the reflection plate 144 may have opposite first and second sides, and may have a thickness that becomes thicker from the first side to the second side.

The light source 143 may be positioned at the first side of the reflection plate 144, and a cover projection 144c may be formed at the second side of the reflection plate 144 for accommodating and covering (or overlapping) the light source 143.

The cover projection 144c may receive the light source 143 to cover (or overlap) an upper side of the light source 143 of an adjacent module when a plurality of the backlight unit modules are assembled, and may prevent the LED 143a at the light incident part 142 of the light guide plate 141 from showing on a display screen.

As described, the reflection plate 144 may have a rim 147 substantially perpendicular to the light source 143, which may be coupled to at least a portion of the third side 141c and the fourth side 141d of the light guide plate 141, for at least partially preventing the light from transmitting to an adjacent light guide portion 140 from the light guide plate 141 through the third side 141c and the fourth side 141d of the light guide plate 141.

If a plurality of the light guide portions 130 or the backlight unit modules are assembled by making the backlight units as modules, the modules may be coupled together as a side hook recess 144d in the reflection plate 144 is placed on a side hook 148 (See FIG. 15) of the adjacent module, and the side hook 148 of the reflection plate 144 is placed in the side hook recess 144d in the adjacent module.

The side hook 148 and the side hook recess 144d may enable easy alignment and assembly of the plurality of modules in a first direction, for example, a transverse (or longitudinal as seen from the other side) direction.

As a fastening member for fastening the frame (not shown) of the backlight unit, the reflection plate 144 may have at least one underside hook 146 at an underside periphery for coupling to the frame (not shown).

The underside hook 146 may enable easy fastening of the light guide plate module to the frame without screws.

Figure 14:
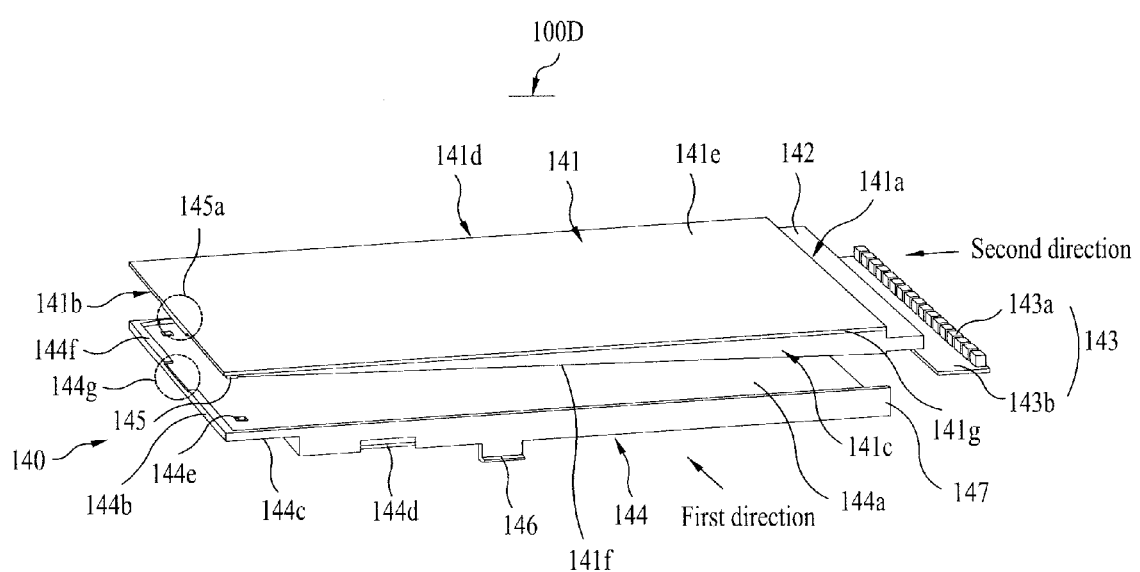
FIGS. 14-21 illustrate diagrams showing a structure of a backlight unit in accordance with a fourth preferred embodiment of the present invention.
Figure 15:
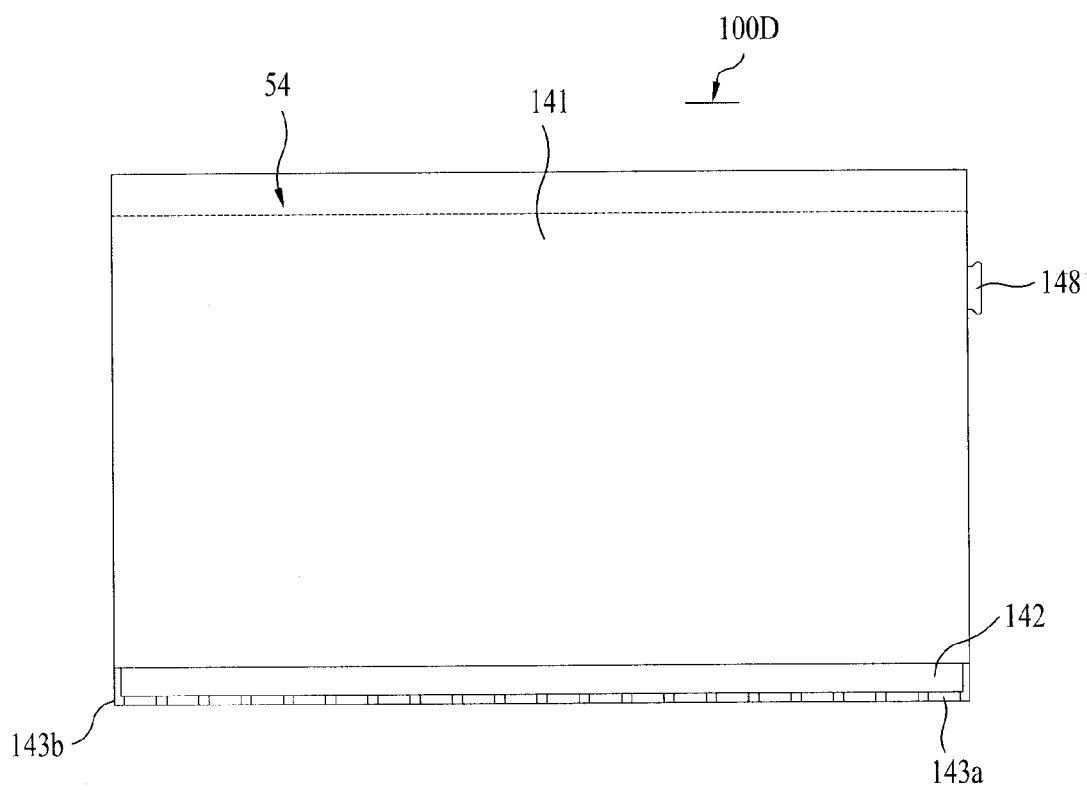
Figure 18:
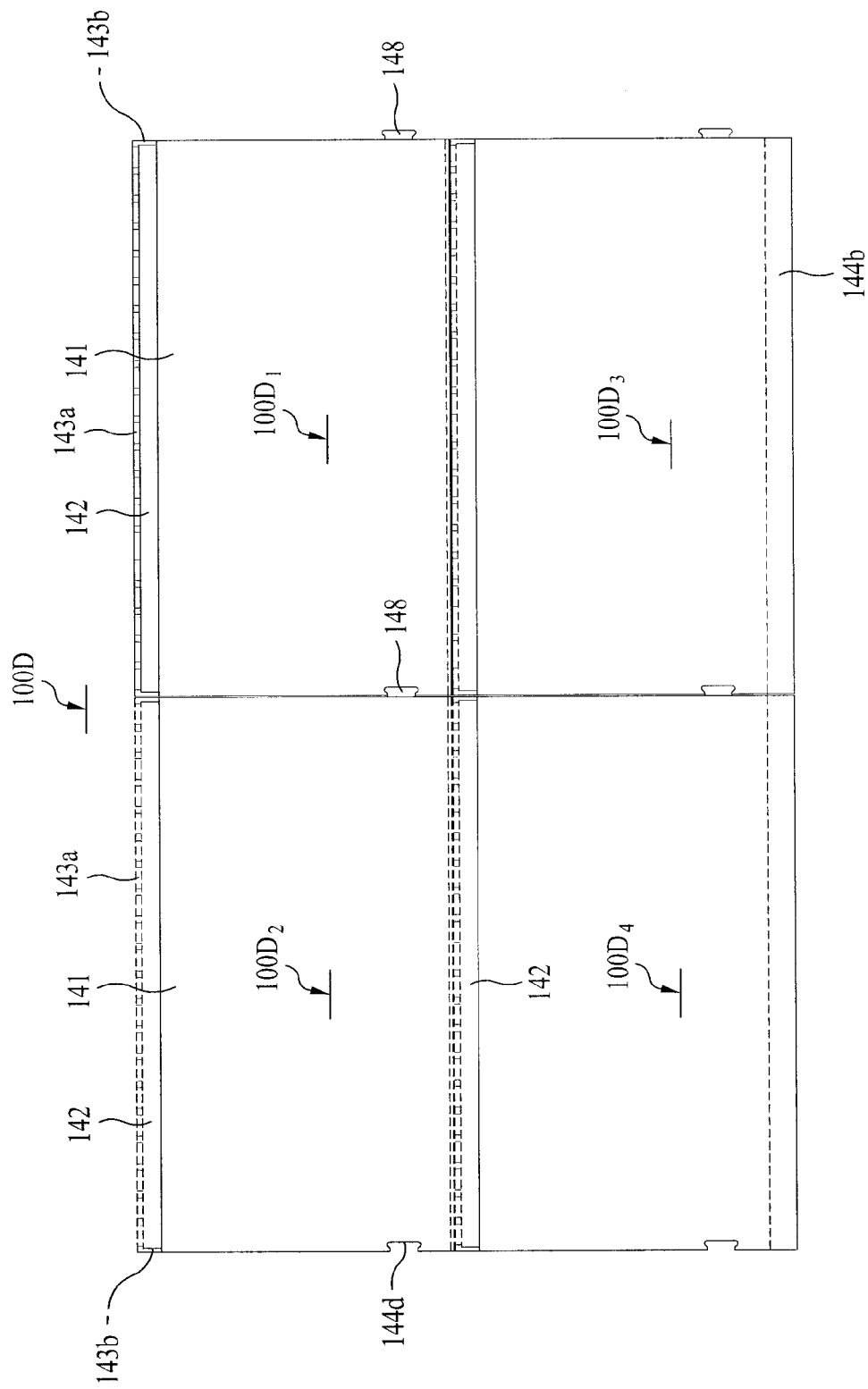

FIG. 18 illustrates a plan view of a large sized backlight unit that is an assembly of a plurality of the backlight unit modules in FIG. 14.

Thus, after fabricating the backlight units as a module, the side hook 148 of a first module 100D$_1$ may be placed in the side hook recess 144d of the second module adjacent thereto to couple the first and second modules together.

By connecting other backlight unit modules to left and right sides of one backlight module, a plurality of modules can be fastened in a first direction (transverse direction as shown in FIG. 14) on a plane.

Figure 19:
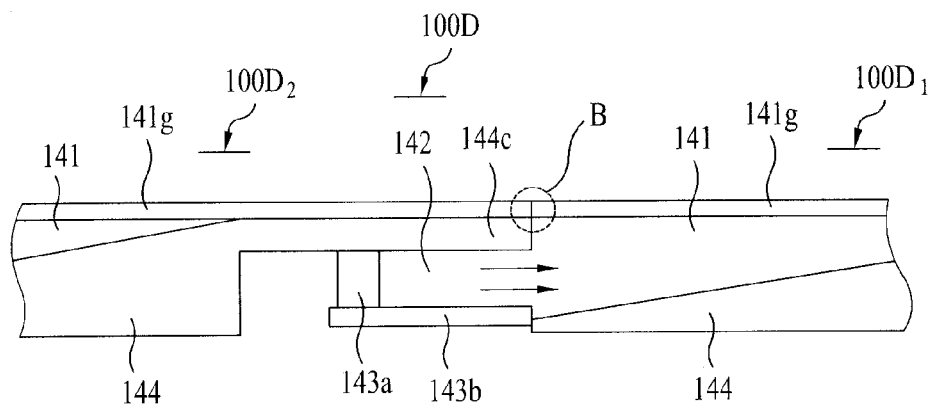

Referring to FIG. 19, modules to be coupled in a second direction (a longitudinal direction (as shown in FIG. 14) may be coupled such that the cover projection 144c of the reflection plate 144 of each of the modules covers (or overlaps) the upper side of the LED 143a of the backlight unit module adjacent thereto.

In this instance, at least some of boundaries between the modules (FIG. 19 illustrates a longitudinal direction boundary) may be made to couple a portion of the light optically. That is, portions of a light incidence part 142 side of the first module 100D$_1$ and an edge side of the second module 100D$_2$ can be made to be at least partially optically shielded by the cover projection 144c of the reflection plate 144.

That is, the cover projection 144c of the reflection plate 144 is configured to reduce light from the corresponding module (the second module 100D$_2$) passing into an adjacent module (the first module 100D$_1$).

Therefore, a "B" portion of the boundary of the adjacent modules can be made to be coupled optically, and by adjusting a thickness of the cover projection 144c or a shape of the edge side, an extent of the optical coupling of the modules can be adjusted. Accordingly, the "B" portion is a light transmitting part enabling optical coupling with the adjacent modules.

By adjusting or regulating the extent of the optical coupling, formation of a bright line of which light is stronger than the light from the light output surface 141e of the light guide plate 141 or a relatively dark line of which light is weaker than the light from the light output surface 141e of the light guide plate 141 can be at least partially prevented. According to this, in case the backlight unit is fabricated by connecting the plurality of modules side by side, a substantially uniform light can be formed by decreasing optical singular point at the light forwarding surface or an interconnected part between adjacent modules.

Figure 20:
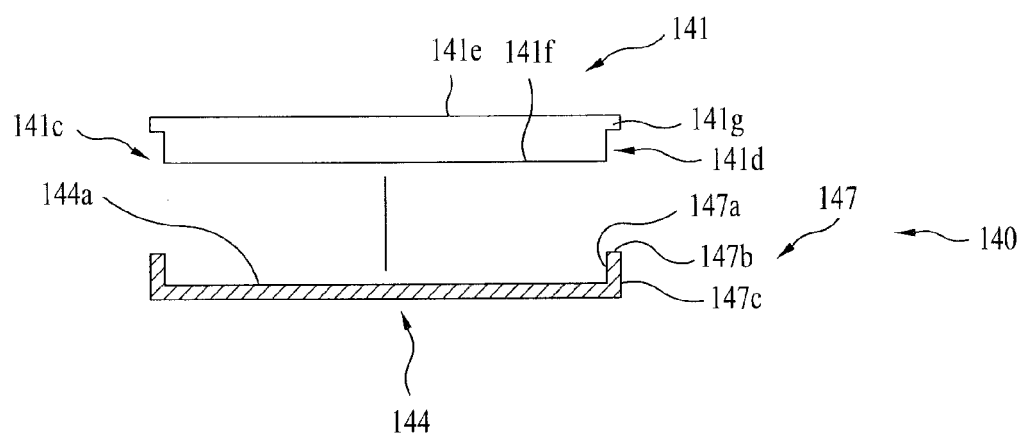
Figure 21:
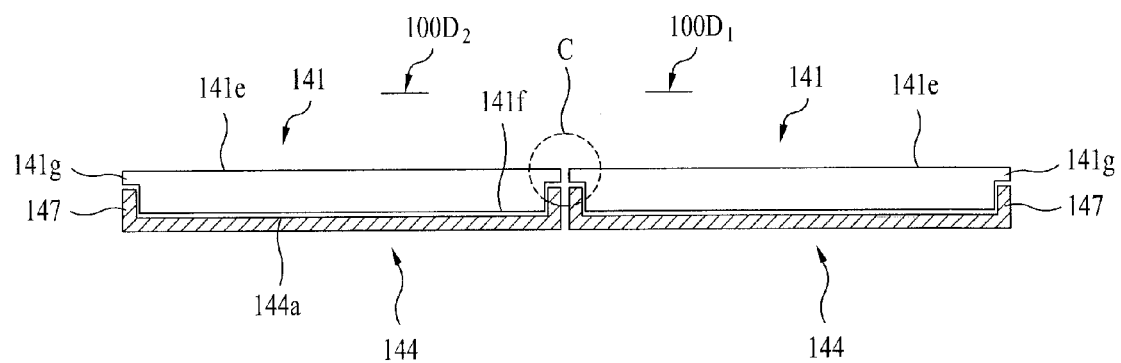

FIGS. 20 and 21 illustrate sections of coupling states of the light guide portions each having the light guide plate 141 and the reflection plate 144, and a transverse direction coupling state of the modules coupled side by side.

As described above, though most of area of the underside 141f of the light guide plate 141 couples to most of the area of the upper side 144a of the reflection plate 144, the rim 147 of the reflection plate 144 couples to the third side 141c and the fourth side 141d of the light guide plate 141, when it can be made that a coupling projection 141g of the light guide plate 141 is positioned over the upper side 147b of the rim 147.

That is, the rim 147 may have an inner side 147a, an upper side 147b and an outer side 147c, wherein the inner side 147a couples to the third side 141c and the fourth side 141d, and the upper side 147b couples to the coupling projection 141g. The outer side 147c may be positioned to be in contact with the outer side 147c of an adjacent module.

Thus, of the boundaries between modules, a portion of the transverse direction boundary can also be optically coupled. In other words, the other portion of the transverse direction boundary may also be optically shielded by the rim 147 of the reflection plate 144.

Accordingly, a C portion of the boundary of the modules adjacent to each other can be made to be coupled optically, and by adjusting a height of the rim 147 or a thickness of the coupling projection 141g, the extent of the optical coupling of the modules can be adjusted. Accordingly, the C portion may be another light transmitting part enabling optical coupling with the adjacent modules.

Such an adjusted optical coupling at the C portion may also suppress the formation of the relatively bright line or the dark line at the light output surface of the entire backlight unit.

The plurality of backlight unit modules coupled in the transverse and longitudinal directions thus are suitable for using as a backlight unit of a large sized display device.

Since the assembly of the plurality of backlight unit modules is made to be easy according to the described structure, a production cost may be reduced.

Moreover, the fabrication of the backlight unit by using the light guide plate may reduce a thickness of the backlight unit, leading to reduction of a total thickness of the display device.

<A Fifth Embodiment>

Referring to FIGS. 22 to 27, the backlight unit 100E in accordance with a fifth embodiment of the present invention may include a light guide plate 151, a light source 153, a reflection plate 154 and at least one space retaining part 157. The light guide plate 151 and the reflection plate 154 together may be called a light guide portion 150 or a light guide plate module 150. Unexplained parts may be similar or identical to elements or parts of the foregoing embodiments.

The light guide plate 151 may have a flat upper side, and a sloped underside, and a light incidence part 152 is projected from a portion of a side.

The light guide plate 151 has opposite first side 151a and a second side 151b, and opposite third side 151c and fourth side 151d.

The light guide plate 151 has a thickness that becomes thinner from the first side 151a to the second side 151b, forming the underside of the light guide plate 151 to be sloped.

The light incidence part 152 at the first side 151a of the light guide plate 151 may have a thickness thinner than a thickness of the first side 151a of the light guide plate 151.

According to this, an upper side of the light incidence part 152 and an upper side of the light guide plate 151 are positioned on planes different from each other.

In order to transmit the light uniformly throughout the light guide plate 151, a portion of a lower side of the light incidence part 152 may be formed unevenly.

An upper side of the circuit board 153b of the light source 153 coupled to the underside of the light incidence part 152 may also be formed unevenly at the same position.

The light guide plate 151 may have at least one fastening protrusion 155 protruding from an underside periphery as a fastening member for coupling to the upper side of the reflection plate 154.

The fastening protrusion 155 is placed in a fastening recess 154a in the upper side of the reflection plate 154 for retaining a position even against an external impact or vibration.

The light guide plate 151 may have at least one space retaining part 157 on an upper side.

Figure 27:
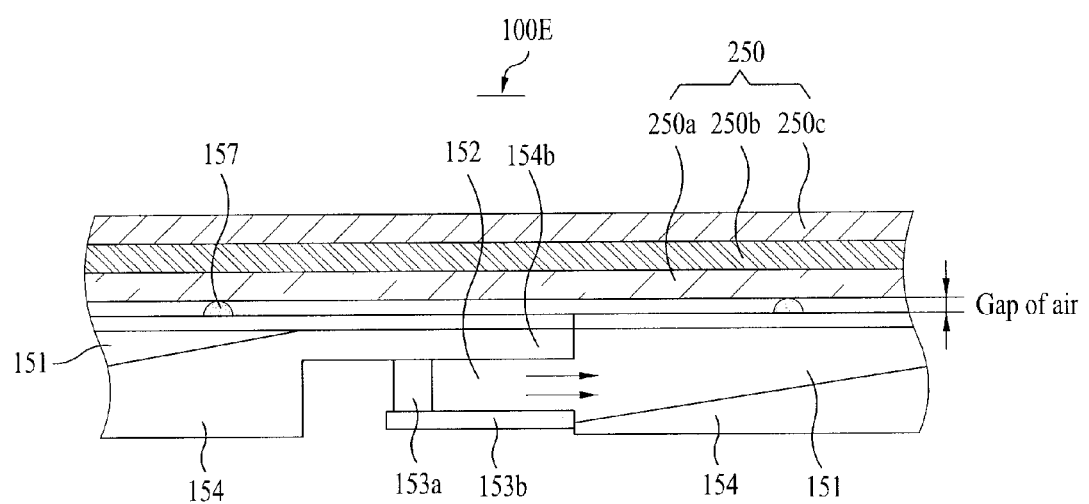

The space retaining part 157 may have at least one protrusion for supporting an optical sheet 250 shown in FIG. 27 to retain a gap of an air layer between the light guide plate 151 and the optical sheet 250.

Of the surfaces of the protrusion 157, a surface in contact with the light guide plate 151 is flat, and a surface in contact with a surface of the optical sheet 250 may be formed to be semi-circular to have a curvature.

A radius of the curvature of the protrusion 157 in contact with the surface of the optical sheet 250 may be about 0.1~1 mm.

This is because a loss of the light due to reflection or refraction at the protrusion 157 may become larger if the radius of the curvature is below about 0.1 mm or over about 1 mm.

Therefore, it is favorable to fabricate the protrusion 157 by adjusting the curvature of the protrusion 157 appropriately such that the light incident onto the protrusion 157 is not lost, but proceeds in a direction of the optical sheet 250 as much as possible.

Moreover, it is beneficial that the protrusion 157 has a height "h" of about 1~2 mm, one of which reason is that, if the height "h" of the protrusion 157 is below about 1 mm, the gap of the air layer may be too small for an incident light to diffuse, making effectiveness of the air layer gap poor, and if the height "h" of the protrusion 157 is over about 2 mm, a total thickness of the backlight unit 100E becomes thick, making effectiveness of the backlight unit poor.

It is beneficial that a distance "d" between adjacent protrusions 157 is about ⅓ of a distance from a light input surface (the light incidence part 152) to a light output surface (a light forwarding surface) of the light guide plate 151.

It may be beneficial that the distance "d" between adjacent protrusions 157 is about 2~3 cm. This is because if the distance "d" between adjacent protrusion 157 is below about 2 mm, a number of the protrusions 157 formed on the surface of the light guide plate 151 increases, causing a light loss coming from reflection and refraction of the incident light, and if the distance "d" between adjacent protrusions 157 is over about 3 mm, the optical sheet 250 supported by the protrusion 157 can overhang or sag, causing improper diffusion of the light.

Therefore, it is beneficial that adjacent projections 157 are symmetric in left/right directions with respect to the surface of the light guide plate 151, and formed at an appropriate distance and number.

It may be beneficial that the protrusion 157 is formed of a material that is transparent and has a low surface tension so that the protrusion 157 can easily adhere to the light guide plate 151.

For example, the protrusion 157 may be formed of PMMA (Polymethylmethacrylate), polycarbonate, cyclic olefin copolymer, and so on, or, depending on cases, the same material with the light guide plate 151.

The light source 153 may be at a side of the light incidence part 152 for emitting the light to the light guide plate 151, and may include at least one LED 152a and a circuit board 153b.

The LED 153a, at the side of the light incidence part 152, may generate and emit the light to the light incidence part 152.

The circuit board 153b may support and couple to undersides of the LED 153a and the light incidence part 152.

The light incidence part 152 may be projected from the side of the light guide plate 151 for decreasing relatively dark portions between the LEDs 153a, and at least partially preventing the light from the LED 153a from leaking directly through interconnected portions between the backlight units.

The reflection plate 154 may couple to an underside of the light guide plate 151 for reflecting the light to the light guide plate 151, and may cover (or overlap) the second to fourth sides 151b, 151c and 151d of the light guide plate 151 for adjusting transmission of the light from the light guide plate 151 to an outside of the backlight unit or adjacent modules.

An upper side of the reflection plate 154 has a slope opposite to the slope of the underside of the light guide plate 151.

Accordingly, if the reflection plate 154 is placed on the light guide plate 151 such that the upper side of the reflection plate 154 couples to the underside of the light guide plate 151, the underside of the reflection plate 154 and the upper side of the light guide plate 151 are parallel to each other.

That is, the reflection plate 154 may have opposite first and second sides, and may have a thickness that becomes thicker from the first side to the second side.

The light source 153 is positioned at the first side of the reflection plate 154, and a cover projection 154b is formed at the second side of the reflection plate 154.

The cover projection 154b covers (or overlaps) an upper side of the light source of an adjacent backlight unit when a plurality of the backlight units are assembled, and may prevent the LED 153a at the light incidence part 152 of the light guide portion 151 from showing on a display screen.

As a fastening member for coupling to the light guide plate 151, the reflection plate 154 may have at least one fastening recess 154a at an upper side periphery.

The fastening protrusion 155 of the light guide plate 151 may be provided in the fastening recess 154a in the reflection plate 154 for maintaining a position even against an external impact or vibration.

The reflection plate 154 may have opposite third side and fourth side, wherein the third side has a side hook recess 154c as a fastening member for coupling to the backlight unit adjacent thereto at the time a plurality of the backlight units are assembled, and the fourth side has a side hook 158 as a member for coupling to the backlight unit adjacent thereto.

If the backlight units are fabricated as modules and a plurality of the backlight units assembled, the backlight units can be coupled together as the side hook recess 154c in the reflection plate 154 is placed on the side hook of the backlight unit adjacent thereto, and the side hook 158 of the reflection plate 154 is placed in the side hook recess in the backlight unit adjacent thereto.

The side hook 158 and the side hook recess 154c enable easy alignment and assembly of the plurality of the backlight units in a transverse (or longitudinal as seen from the other side) direction.

As a fastening member for fastening the back cover (not shown) of the backlight unit, the reflection plate 154 has at least one underside hook 156 at an underside periphery for coupling to the back cover or a frame (not shown).

The underside hook 156 enables easy fastening of the reflection plate 154 to the back cover of the backlight unit without screws as in the related art.

Figure 22:
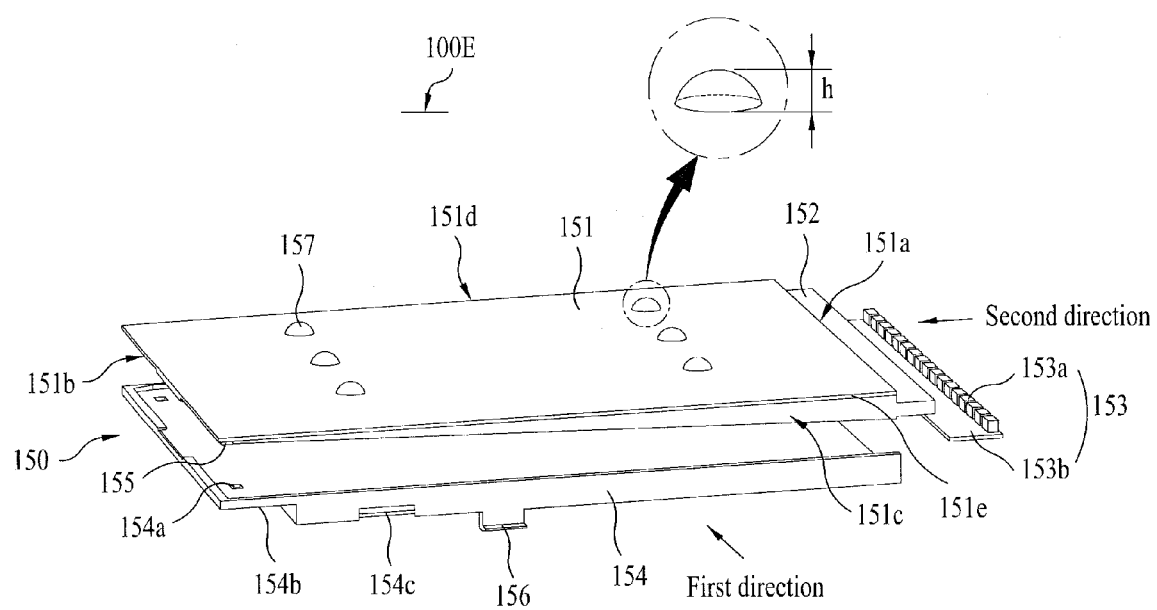
FIGS. 22-27 illustrate diagrams showing a structure of a backlight unit in accordance with a fifth preferred embodiment of the present invention.
Figure 23:
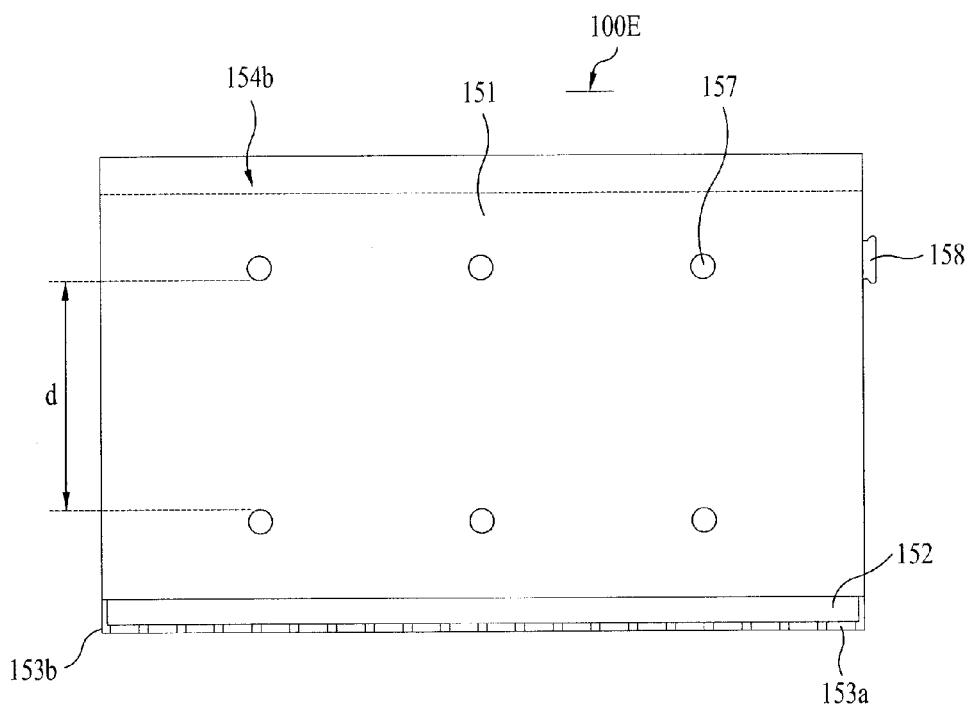
Figure 24:
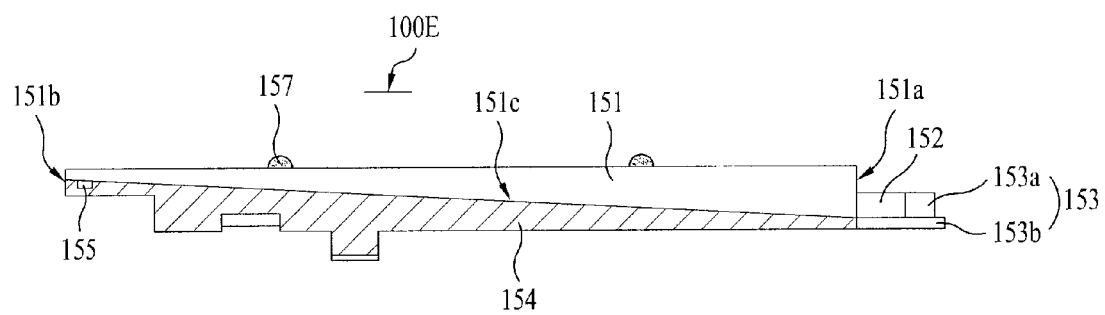
Figure 25:
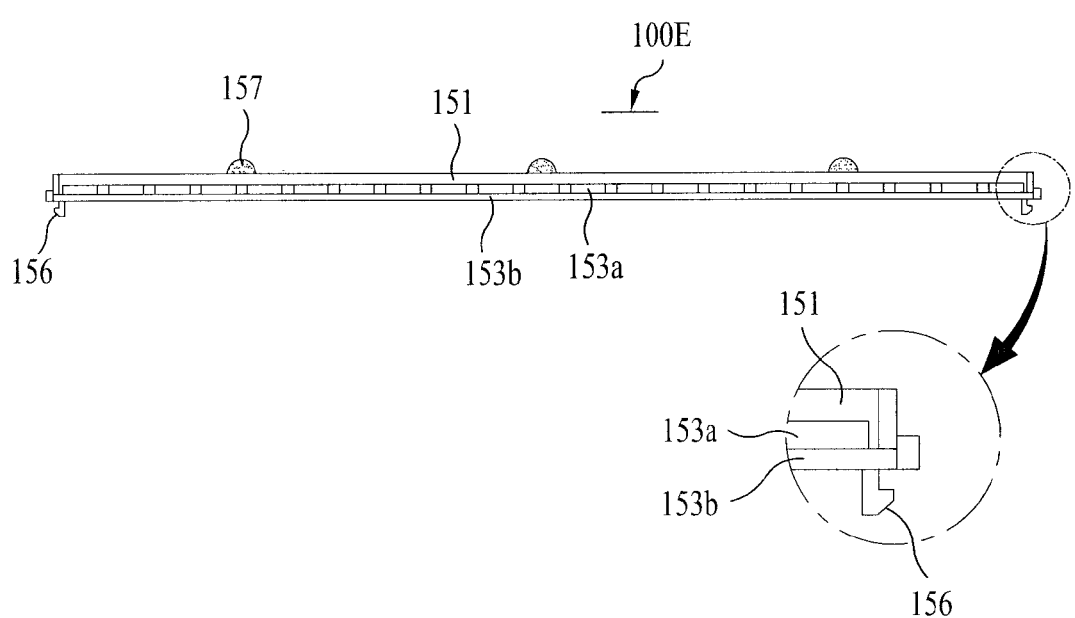
Figure 26:
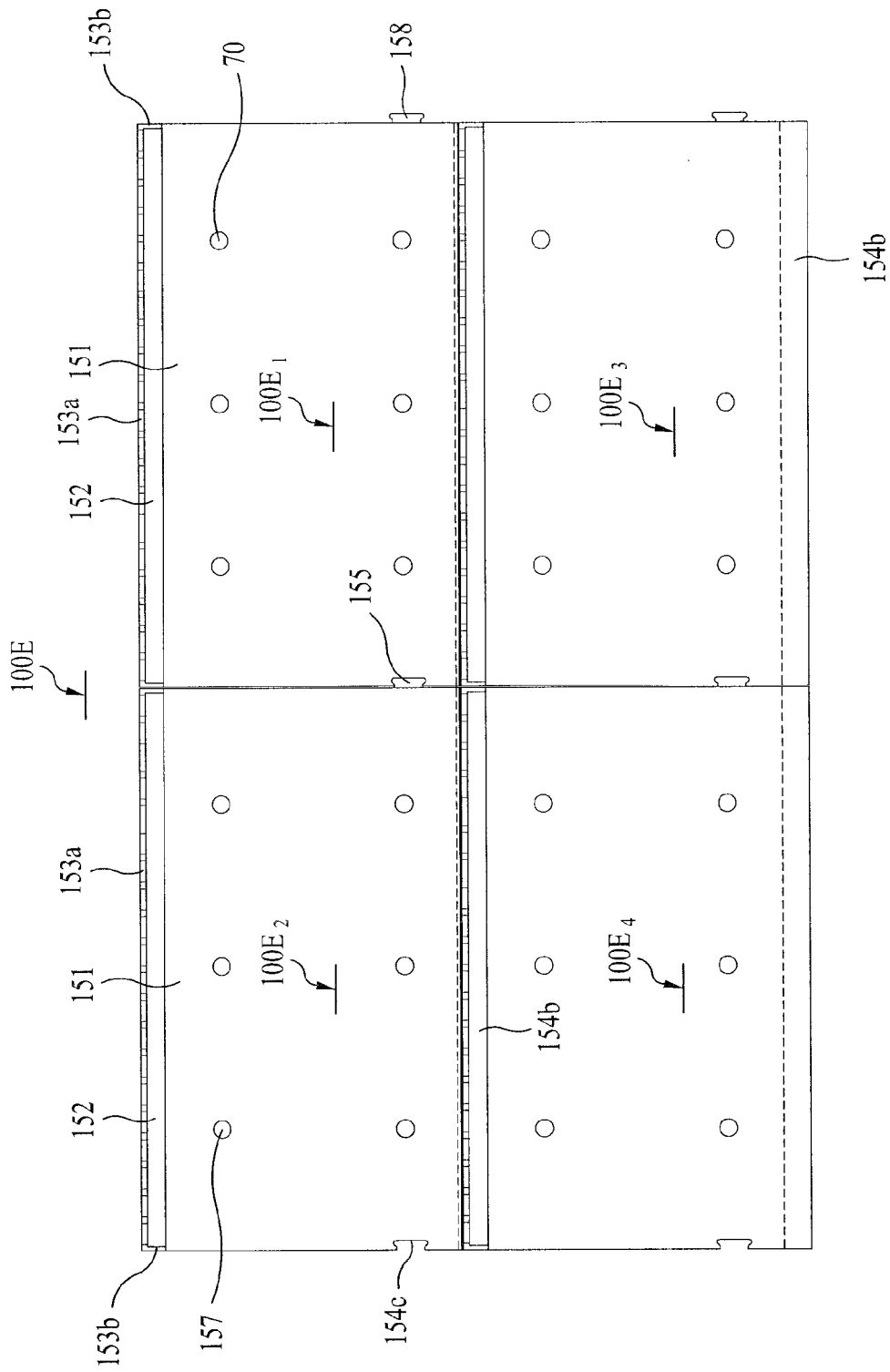

FIG. 26 illustrates a large sized backlight unit having a plurality of the backlight units in FIG. 22 fabricated into modules and assembled together.

Referring to FIG. 26, after fabricating the light guide portion 150 (or light guide part) having the light guide plate 151 and the reflection plate 154 under the light guide plate 151 as a module, the side hook 158 of one module may be placed in the side hook recess 154c in the other backlight unit adjacent thereto to couple the one module to the other backlight unit.

By connecting the backlight units on opposite sides of the backlight unit, a plurality of the backlight units can be aligned in a transverse direction.

Referring to FIG. 27, in the backlight units arranged in a longitudinal direction, the cover projection 154b of the reflection plate 154 of the backlight unit may cover (or overlap) an upper side of the LED 153a of the backlight unit adjacent thereto, for at least partially preventing the LED 153a at the light incidence part 152 of the light guide plate 151 from showing on a display screen.

The backlight unit has an underside hook 156 for fastening to the back cover (not shown) of the backlight unit.

The protrusion 157 on the upper side of the light guide plate 151 may support the optical sheet 250 for retaining a gap of the air layer between the light guide plate 151 and the optical sheet 250.

The air layer diffuses the light from the light guide plate 151 like a related art diffusion plate owing to a difference of refractive indices.

The light diffused at the air layer incident on the display panel such that the light is distributed throughout the display panel uniformly as the light pass through the optical sheet 250, enabling the display panel to obtain a relatively uniform brightness.

The optical sheet 250 may have the diffusion sheet 250a, a prism sheet 250b, and a protective sheet 250c stacked in succession, wherein the diffusion sheet 250a scatters the light from the light guide plate 151 to make a brightness distribution of the light uniform, the prism sheet 250b converges the light to the display panel, and the protective sheet 250c protects the prism sheet 250b.

By forming the gap of the air layer between the light guide plate and optical sheet with the projection of the light guide plate, an optical unevenness taking place at a boundary of adjacent light guide plates may be reduced.

<A Sixth Embodiment>

Figure 28:
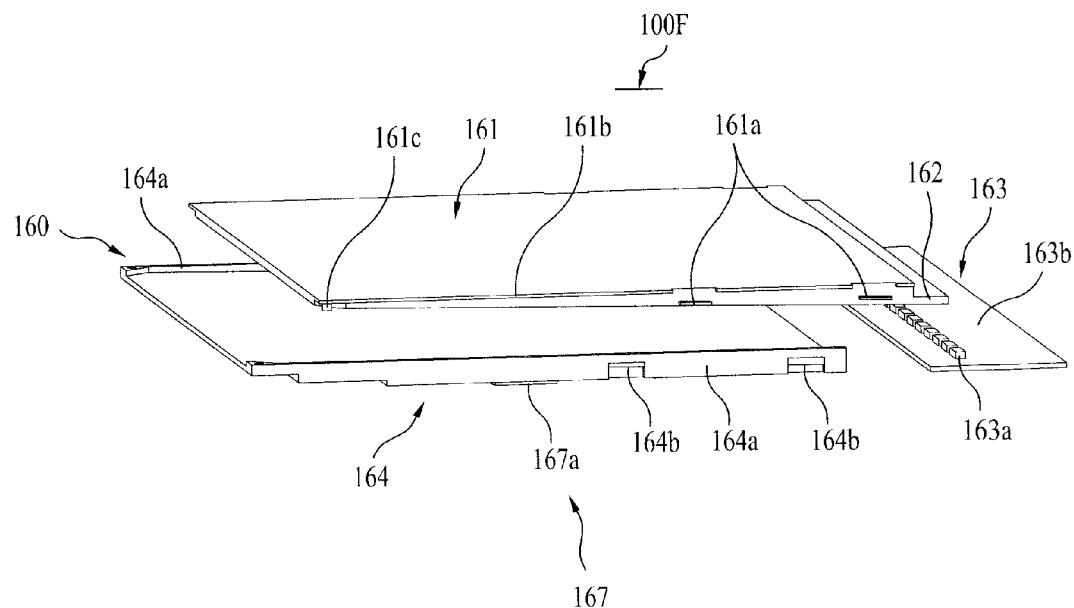
FIGS. 28-33 illustrate diagrams showing a structure of a backlight unit in accordance with a sixth preferred embodiment of the present invention.
Figure 29:
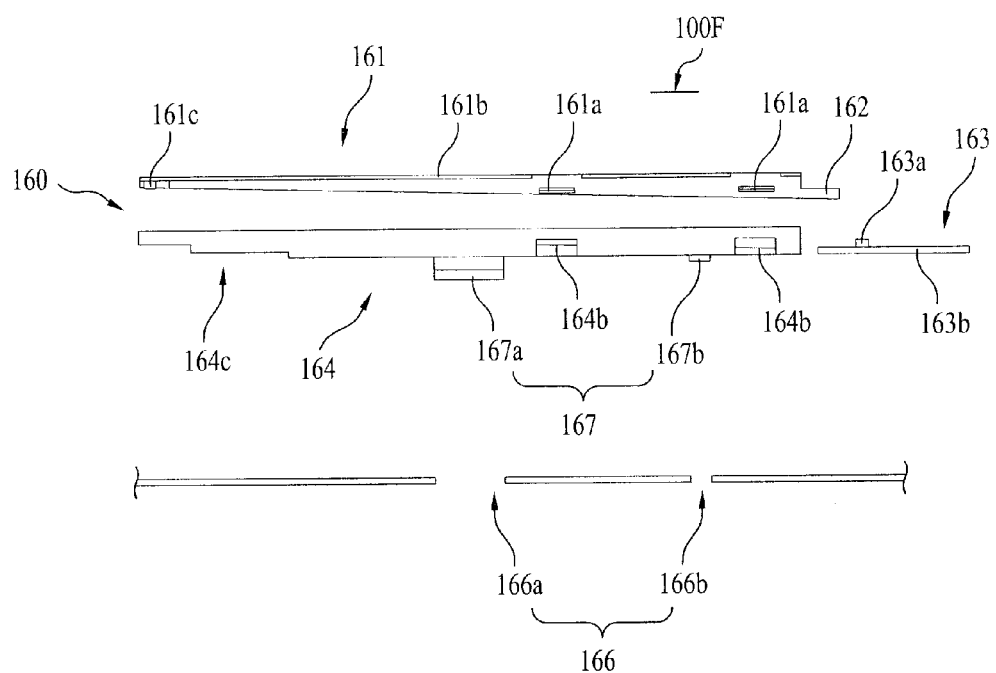

Referring to FIGS. 28 and 29, the backlight unit 100F in accordance with a sixth preferred embodiment of the present invention may include a light guide plate 161, a light source 163, a reflection plate 164 and a frame 165. Elements or parts previously mentioned may not be further discussed for ease of discussion. The light guide plate 161 and the reflection plate 164 may together be called a light guide portion or a light guide module 160.

The light guide plate 161 may have a flat upper side, a sloped underside, and a light incidence part 162 at a portion of a side for receiving a light from the light source 163.

The light guide plate 161 may have a thickness that becomes thinner as a distance increases from the light incidence part 162, making the underside of the light guide plate 161 sloped on the whole.

The light source 163 includes a circuit board 163b having the LED 163a mounted thereon.

The light incidence part 162 of the light guide plate 161 may have a thickness thinner than the light guide plate 161 and projected from the light guide plate 161. That is, since the light incidence part 162 is projected from an effective screen, the light incidence part 162 may decrease a relatively dark portion caused by a gap between the light sources 163, and may prevent the light from leaking direct from the light source 163 through a connection portion between the light guide plates 161.

The reflection plate 164 is coupled to an underside of the light guide plate 161, for example, by means of a fastening protrusion 161a of the light guide plate 161 to a fastening hole 164b in the reflection plate 164.

The reflection plate 164 may have a rim 164a on at least a side for the light guide plate 161 to securely couple to the reflection plate 164.

Referring to FIGS. 28 and 29, the rim 164a is shown angled upward from opposite edges of the reflection plate 164 and extended therefrom, with the light guide plate 161 disposed therebetween.

At least one fastening hole 164b may be formed in the rim 164a, enabling the fastening protrusion 161a on the light guide plate 161 to be fastened to the fastening hole 164b more securely.

The light guide plate 161 may have projection 161b along opposite edges of the light guide plate 161 in contact with edges of the rim 164a for positioning the light guide plate 161 with respect to the reflection plate 164.

Since the projection 161b is positioned over the edge of the rim 164a and is connected to the projection 161b on an adjacent light guide plate 161, the rim 164a can prevent the light from being discontinued and adjust an extent of light coupling to an adjacent light guide portion 160.

In a case the backlight units 100F (in accordance with the sixth preferred embodiment having the light guide plate 161 and the reflection plate 164) are connected side by side, the rim 164a may be invisible if seen from a light output side.

The rim 164a may also include a function of the reflection plate 164 to cover (or overlap) at least a portion (a portion excluding the projection 161b) of a side of the light guide plate 161, such that when the backlight units adjacent to each other are coupled together as modules, the transmission of the light to an adjacent backlight unit is adjusted, enabling to adjust a relatively bright line or a dark line formed at a boundary of the modules.

Since the light incidence part 162 and the edge opposite thereto of the light guide plate 161 are not covered (or overlapped) with the rim 164a, possible formation of relatively bright/dark line at the boundary of the light guide plates 161 and relatively dark portion at the light incidence part 162 caused by the raised portion (or step) of the light incidence part 162 can be reduced, thereby significantly improving uniformity of the light from a plurality of the light guide plates 161.

By providing a connection part 161c at the other edge of the light incidence part 162 of the light guide plate 161 for additionally fastening to the reflection plate 164, the light guide plate 161 can be coupled to the reflection plate 164 more rigidly.

When the light guide plate 161 is coupled to the reflection plate 164 together, the edge 164c of the reflection plate 164 on an opposite side of the light incidence part 162 has a raised portion (or step) such that the edge 164c is positioned over the adjacent light incidence part 162, for example as shown in FIG. 29.

If the edge 164c of the reflection plate 164 is positioned over the adjacent light incidence part 162, direct emission of the light from the LED 163a at the light source 163 to an outside of the backlight unit can be prevented.

That is, by providing the LED 163a at a side of the light guide plate 161 and the reflection plate 164 formed in a small size, an adequate light quantity can be secured, heat from the LED 163a can be dispersed, and the LED 163a at the side of the light guide plate 161 and the reflection plate 164 can be optically hidden.

Figure 30:
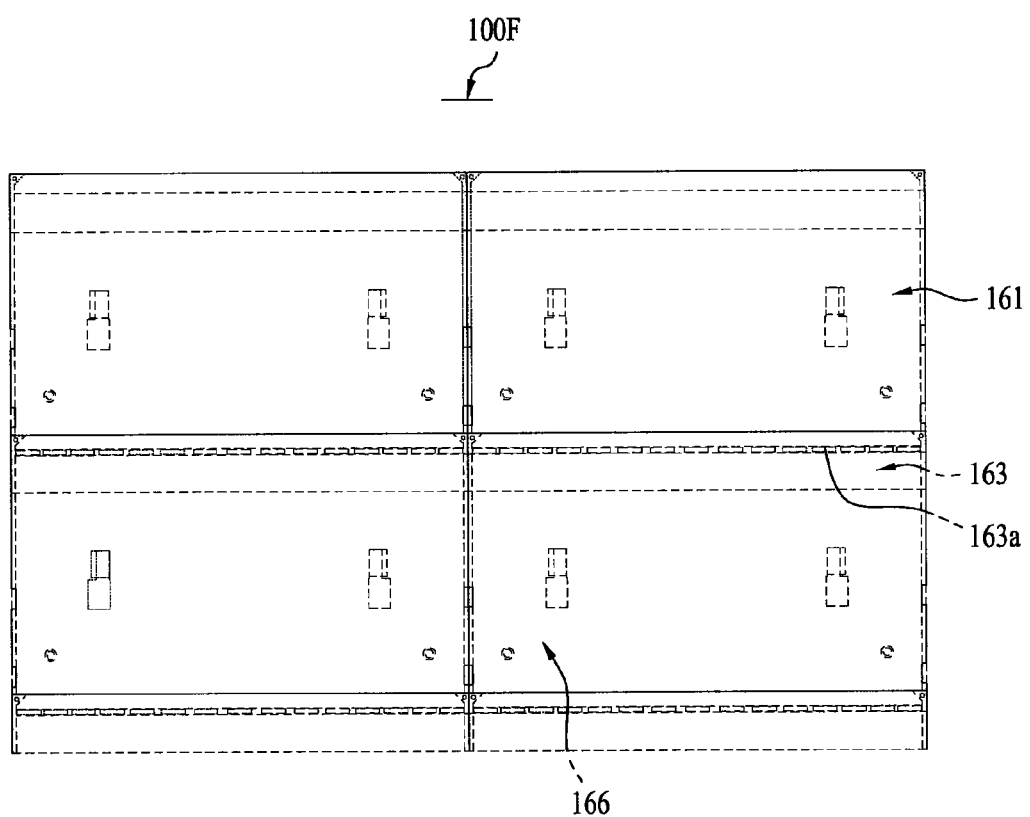

Referring to FIG. 30, since a large sized backlight unit can be fabricated by coupling the light guide plate 161 and the reflection plate 164 adjacent to each other, it may be beneficial to maintain a relative position of the light guide 161 and the reflection plate 164 constant.

That is, when a plurality of the backlight units 100F each having the light guide plate 161 and the reflection plate 164 in accordance with the sixth preferred embodiment are coupled together, size variation of the light guide plate 161 and the reflection plate 164 of the backlight unit can be kept small.

Thus, when the plurality of the backlight units 100F in accordance with the sixth preferred embodiment are coupled together to form the large sized backlight unit, the backlight unit 100F may include a light guide portion connection part 167 for coupling the light guide portion 160 having the light guide plate 161 and the reflection plate 164 to a frame 165.

The light guide portion connection part 167 may be fastened to a frame connection part 166 at the frame 165.

Figure 31:
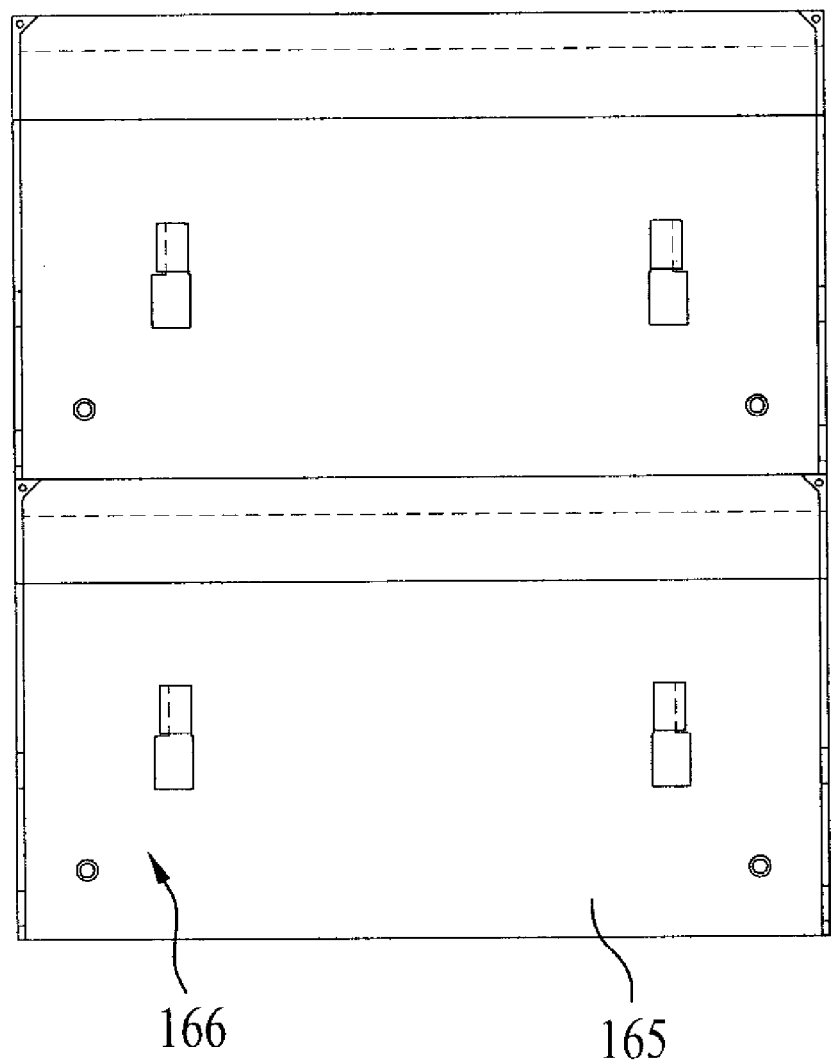
Figure 32:
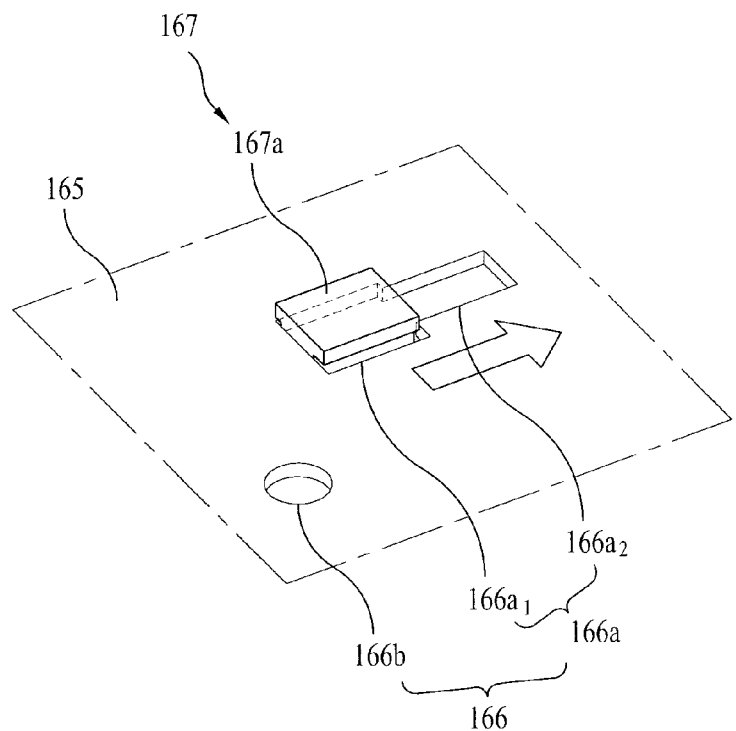
Figure 33:
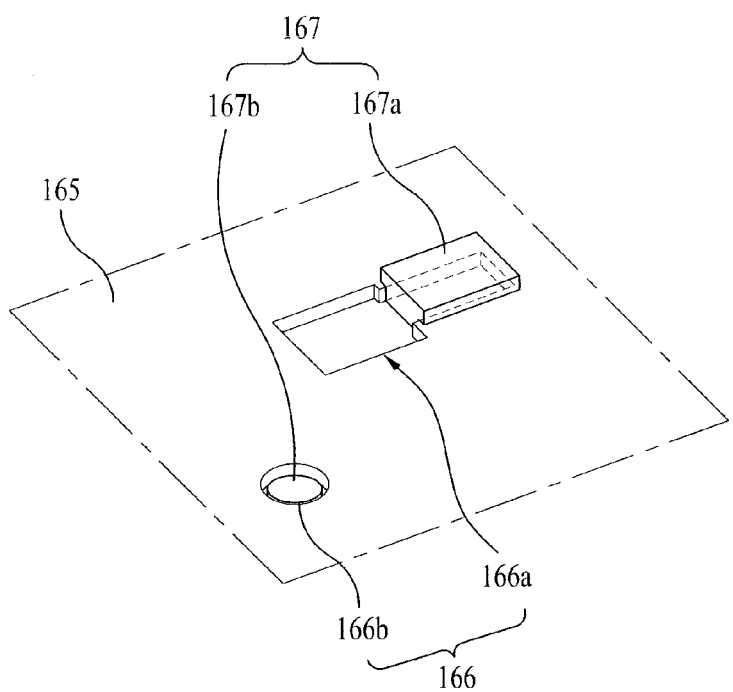

In this instance, referring to FIGS. 31 to 33, the light guide portion connection part 167 can be slidably fastened to the frame connection part 166.

That is, the light guide portion connection part 167 has a projection 167a, and the frame connection part 166 has a sliding slot 166a for placing the projection 167a therein and sliding the projection 167a thereon until the projection is fastened.

Referring to FIG. 32, the sliding slot 166a has a first slot $166a_1$ for placing the projection 167a therein, and a second slot $166a_2$ extended from and narrower than the first slot $166a_1$.

Accordingly, by fastening the light guide portion connection part 167 to the frame connection part 166, the light guide plate 161 and the reflection plate 164 can be easily coupled to the frame 165.

That is, without additional screw fastening, the light guide plate 161 and the reflection plate 164 can be coupled to the frame 165, a fastening direction (an arrow direction in FIG. 32) of the slidable fastening can be in any direction of upper/lower, left/right directions.

Referring to FIG. 33, the light guide portion connection part 167 may additionally have a supplementary (or auxiliary) protrusion 167b and the frame connection part 166 may additionally have an inserting hole (opening) 166b for inserting the supplementary protrusion 167b therein.

By making the supplementary protrusion 167b and the inserting hole 166b to be fastened together at a position the protrusion 167a and the sliding slot 166a are fastened together, after the light guide plate 161 and the reflection plate 164 are slidably coupled to the frame 165, the coupling state can be kept rigidly.

As shown, it may be favorable that the light guide portion connection part 167 is positioned at the reflection plate 164.

The light guide plate 161 and the reflection plate 164 coupled adjacent to each other can be coupled in a transverse direction or a longitudinal direction, and by connecting the light guide plate 161 and the reflection plate 164 and the light source 163, a backlight unit for a large sized display device can be fabricated.

By connecting the light guide plate 161 and the reflection plate 164 in a tiling fashion, reliability of the large sized backlight unit can be improved, and local dimming in which the light source 163 is driven partially according to an image can be applicable, enabling to produce an image of a high contrast ratio.

<A Seventh Embodiment>

Figure 34A:
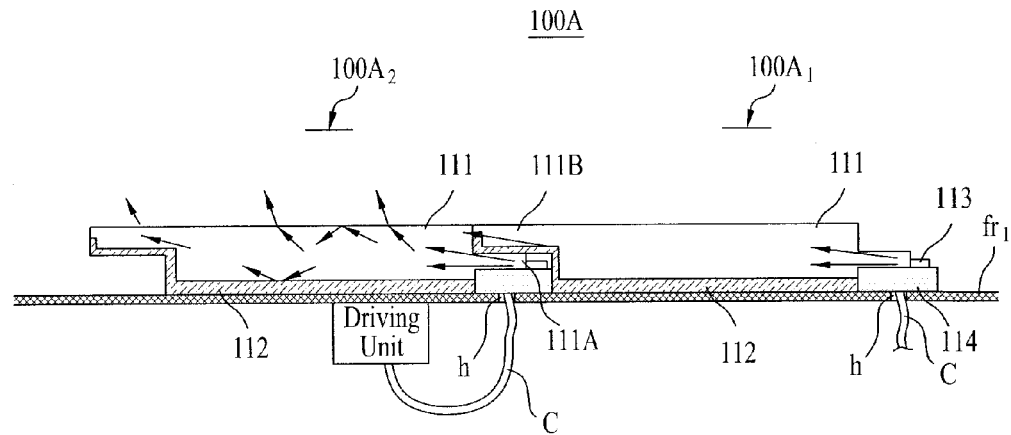
FIGS. 34($a$)-34($c$) are sectional views illustrating a LED backlight unit of a LCD according to a seventh embodiment of the present invention.
Figure 34B:
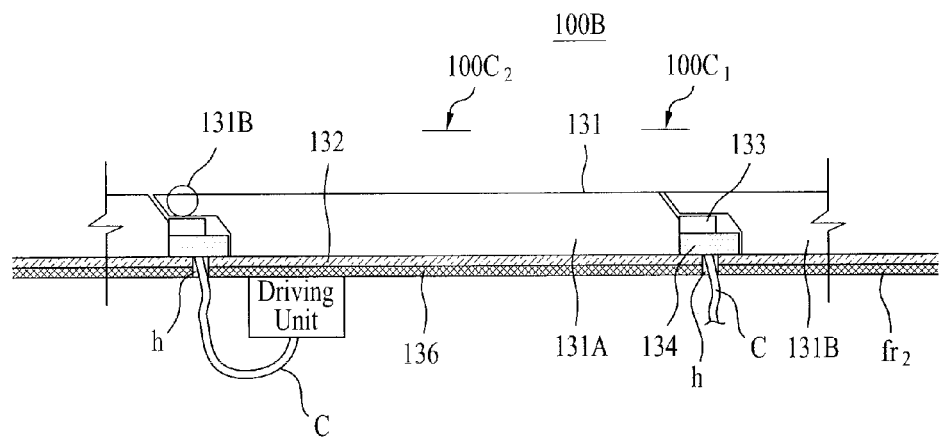
Figure 34C:
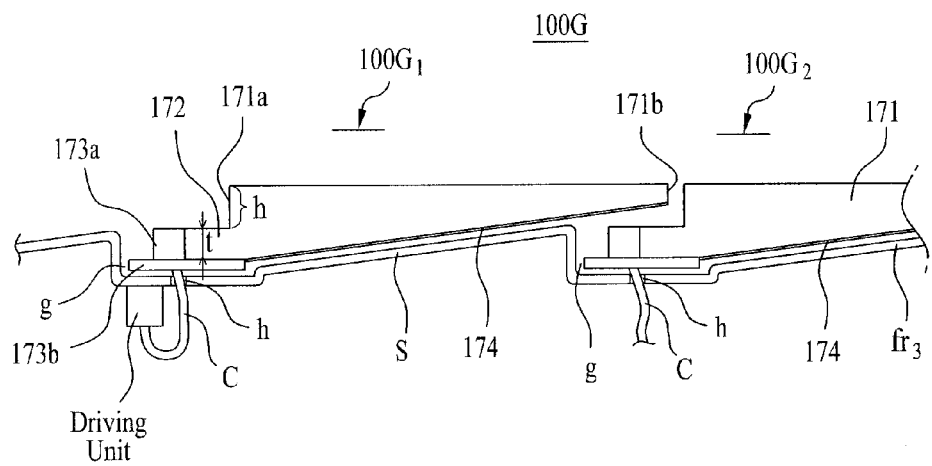

FIGS. 34(a)-34(c) show an LED backlight unit according to example embodiments of the present invention. More specifically, FIGS. 34(a) and 34(b) are examples based on the LED backlight unit shown in FIGS. 3 and 13, respectively. Thus, a repeated description related to FIGS. 3 and 13 may be omitted.

LCD type displays may include a frame under the LED backlight unit and a driving unit having various driving circuits or a power circuit may be provided on a backside of the frame. FIG. 34(a) shows a driving unit on a backside of frame fr1, FIG. 34(b) shows a driving unit on a backside of frame fr2, and FIG. 34(c) shows a driving unit on a backside of frame fr3.

An auxiliary reflection plate may be provided between the frame and the light guide plate. The reflection plate may not be provided if the frame is coated with a reflective material.

A single reflection plate may be provided so as to correspond to a single light guide plate or at least two light guide plates may be arranged so as to correspond to a single reflection plate. FIG. 34(b) shows a plurality of light guide plates arranged on the single reflection plate 132. FIG. 34(c) shows a reflection plate 174.

The driving unit may be mounted to the backside of the frame to drive or control the LED backlight unit or the liquid crystal panel. Stated differently, the driving unit may be provided on a surface of the frame.

The LCD may include a liquid crystal (LC) panel, an optical sheet provided under the LC panel, a LED backlight unit, a frame, at least one driving unit, a front cover and a rear cover. The backlight unit may have X (X>=1) circuit boards, a light source having a plurality of LEDs provided on the circuit board K (K=1, 2, 3, N), light guide plates having a first side surface for receiving light emitted from the LED of the light source thereon and a second side surface facing the first side surface and P (N>P>=1) reflection plates provided under the light guide plates, at least one reflection plate may have a plurality of light guide plates thereon. The frame may be provided under the backlight unit. The driving unit may be provided in or on a backside (or side) of the frame. The front cover may cover a front surface of the LC panel and the rear cover may cover a rear surface of the LED backlight unit. The circuit board of the light source or the plural LEDs mounted on the circuit board may be operably dividedly and a plurality of connection holes may be spaced apart from each other by a predetermined distance in the frame to connect the circuit board of the light source to the corresponding driving unit.

The LED backlight unit may include the X (X>=1) circuit boards 134, the light source having the plural LEDs arranged on the circuit boards 134, the K (K=1, 2, 3, N) light guide plates 131 having the first side surface for receiving light emitted from the LEDs 133 of the light source incident thereon and the second side surface facing the first side surface, and the P (N>P>=1) reflection plates provided under the light guide plates 131. At least one reflection plate may have a plurality of light guide plates arranged thereon.

The number (N) of the light guide plates 131 may be less than the number (P) of the reflection plates 132. Thus, a plurality of light guide plates may be arranged on at least one reflection plate.

FIGS. 34(*a*) and 34(*b*) show that a lower surface may be defined by the reflection plate and the circuit board 114, 134 may maintain a plane (or define a plane). As a result, the frame (fr1 and fr2) provided under the reflection plate 112, 132 may be a plane frame.

According to the embodiment shown in FIG. 34(*c*), the LED backlight unit 100G and the light guide plates 171 may have the following characteristics.

As shown in FIG. 34(*c*), a light guide plate 171 may be provided under the LCD panel and a light incidence part 172 having light emitted from LEDs 173*a* may be directly mounted to circuit board 173*b* without any auxiliary mounting members. The light guide plate 171 may include a first side surface 171*a* and a second side surface 171*b* facing the first side surface 171*a*. An end of light guide plate 171 toward the second side surface 171*b* may be adjacent to the first side surface 171*a* of another neighboring light guide plate 171. The second side surface 171*b* may be thinner than the first side surface 171*a* and each of the light guide plates 171 may have a thickness that gradually changes from the first side surface 171*a* toward the second side surface 171*b*.

The light guide plate 171 may be divided into a light incidence part and a and part. More specifically, the light guide plate 171 may be divided into a light incidence part 172 having an incident surface for receiving light emitted from the LEDs 173*a* and a light emission part (i.e., the portion of the light guide plate 171 other than the light incidence part 172) to emit the incident light upward.

The circuit board 173*b* may include the plurality of LEDs 173*a* arranged on the circuit board 173*b* to emit the light with an orientation angle with respect to a predetermined first direction. The predetermined first direction may be a direction along which the light is emitted from the LEDs 173*a*, and more specifically may be a direction from the first side surface 171*a* toward the second side surface 171*b*.

The light emitted from the LEDs 173*a* is emitted in the first direction (i.e., toward the incident surface of the light incidence part 172). That is, the direction of the light emitted from the LEDs 173*a* may be limited toward the incident surface of the light incidence part 172.

The incident surface of the light incidence part 172 may be a side surface of the light incidence part 172 facing the surface receiving light emitted from the LEDs 173*a*.

An upper surface of the light emission part may be a light output surface and the reflection plate 174 may be provided under a lower surface of the light emission part. The light guide plate 171 may include a raised portion (or step) fanned by a height difference between an upper surface of the light incidence part 172 and an upper surface of the light emission part.

As shown in FIG. 34(*c*), a thickness (t) of the light incidence part 172 may be equal to or less than the height (h) of the raised portion and the height (h) of the raised portion is equal to or greater than the thickness of an end portion of the light emission part at the second side surface 171*b*.

The thickness of the LED 173*a* may be equal to or less than the thickness of the light incidence part 172. Based on the above configuration, most of the light emitted from the LEDs 173*a* may be incident on the incident surface of the light incidence part 172.

The plural light guide plates 171 may have light output surfaces to form an identical plane surface. The light guide plates 171 may secure a spaced distance from each other, and not in contact, to reduce thermal deformation. For example, FIG. 34(*a*) shows the reflection plate 112 is provided between the light guide plates 111. FIG. 34(*b*) shows that the light guide plates 131 are physically spaced apart from each other. FIG. 34(*c*) shows the light guide plates 131 are spaced apart a predetermined distance from each other with the reflection plate 174 provided there between.

The light incidence part 172 having the light incident thereon may project from a lower portion of the first side surface 171*a* of each light guide plate 171. The LEDs 173*a* mounted on the circuit board 173*b* may be horizontally arranged under the light incidence part 172 and may be adjacent to the side portion of the light incidence part 172.

The height of the LEDS 173*a* may correspond to the height of the light incidence part 172 and a portion of the first side surface 171*a* other than the light incidence part 172, and may be substantially perpendicular to the side portion of the light incidence part 172.

The thickness of the light incidence part 172 may be equal to less than a half of the thickness of the first side surface 171*a*.

The light guide plate 171 may include the raised portion formed by the height difference between the upper surface of the light incidence part 172 and the upper surface of the light emission part.

The LEDs 173*a* may be mounted on the circuit board having a predetermined portion extended toward a under portion of the light incidence part 172 and thus the circuit board 173*b* may be arranged under the light incidence part 172. The light guide plate 171 may have a thickness that decreases based on distance from the first side surface 171*a* toward the second side surface 171*b*. The upper light output surface of the light guide plate 171 may be horizontal. Because of the thickness change of the light guide plate 171 and the thickness of the circuit board 173*b*, a back surface of the LED backlight unit may have projections and/or recesses formed continuously at predetermined intervals.

FIG. 34(*c*) shows that the frame fr3 may have a shape corresponding to a shape of the lower surface of both the light guide plate 171 and the circuit board 173b. The shape of the frame fr3 is different from the frames fr1, fr2 shown in FIGS. 34(a) and 34(b), respectively.

According to the embodiment of FIG. 34(c), the frame fr3 provided under the LED backlight unit 100E may include a plurality of recesses (g) corresponding to projections of the light incidence part 172 and the circuit board 173b.

The LCD having the above described light guide plates may include a plurality of modules 100G1 and 100G2 including the circuit board 173b, where the plurality of LEDs 173a may be arranged on the circuit board 173b for emitting light with an orientation angle with respect to a predetermined direction and a plurality of light guide plates including the light incidence part 172 having the incident surface for receiving light emitted from the LEDs 173a and the light emission part for emitting light upward. The modules 100G1 and 100G2 may be simultaneously provided on the frame fr3 to form a single LED backlight unit 100G.

As shown in FIG. 34(c), the plural modules may include a first module 100G1 and a second module 100G2 adjacent to the first module 100G1. The first module 100G1 may include a first circuit board, a plurality of LED light sources arranged on the first circuit board for emitting light, with an orientation angle with respect to a predetermined direction, and a first light guide plate including a light incidence part including an incident surface having the light incident thereon from the LED light source and a light emission part for emitting the incident light upward. The second module may include a second circuit board, a plurality of LED light sources arranged on the second circuit board for emitting light, with an orientation angle with respect to a predetermined direction, and a second light guide plate including a light incidence part including an incident surface having the light incident thereon from the LED light source and a light emission part for emitting the incident light upward. A predetermined portion of the light emission part of the light guide plate of the first module may cover (or overlap) an upper portion of the light guide plate of the second module. That is, a predetermined portion of each light incidence part having the light incident thereon from the LEDS may have an overlapped portion with an end of the neighboring light guide plate toward the second side surface. According to the embodiment shown in FIG. 34(c), the end portion of the light guide plate toward the portion with the decreased thickness may extend close to the light incidence part and the LEDs of the second module 100G2.

The reflection plate 174 may be provided under the liquid guide plate 171 to block and/or shut off the light emitted toward an extended direction of the LEDs.

The light emission part of the first module light guide plate may be spaced apart by a predetermined distance from the light emission part of the second module 100G2 to minimize thermal deformation of the light guide plate and the like.

FIG. 35 is a sectional view illustrating an LED backlight module forming the LED unit according to an example embodiment and a circuit board for forming the backlight module.

Figure 35A:
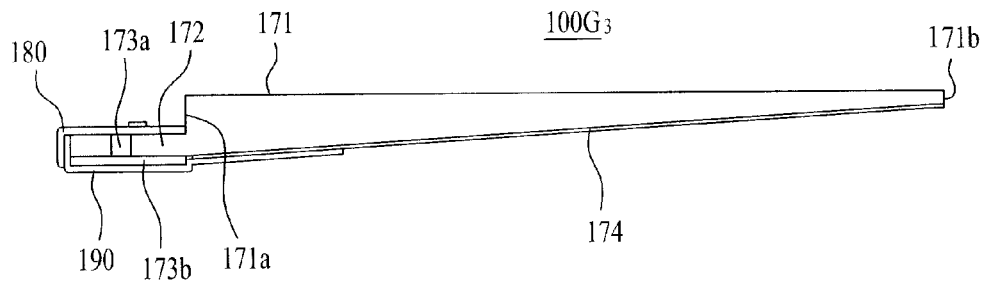
FIGS. 35($a$)-35($c$) illustrate an LED backlight module of the LED backlight unit shown in FIG. 34 and a circuit board of the LED backlight module.
Figure 35B:
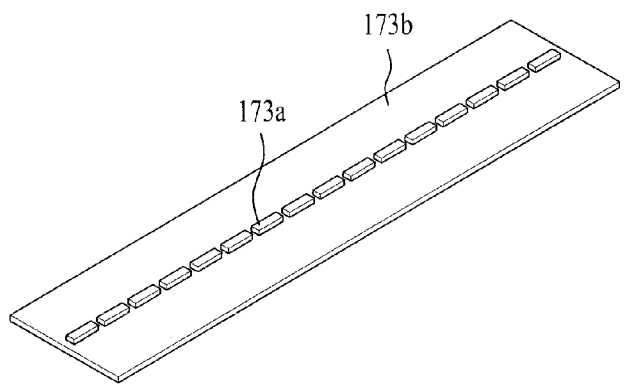
Figure 35C:
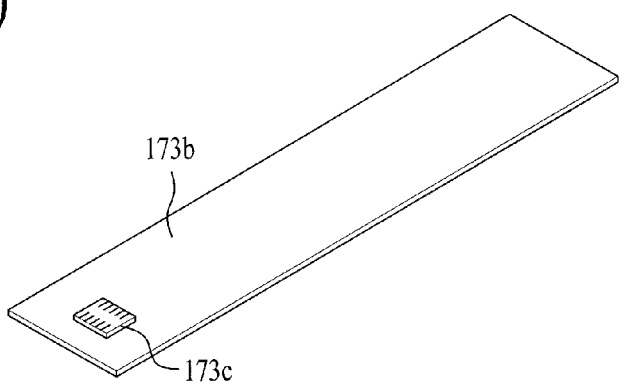

More specifically, FIG. 35(a) is a sectional view illustrating an example embodiment of the LED backlight module and FIGS. 35(b) and 35(c) are perspective views illustrating an upper surface and lower surface of a circuit board for forming the light source, respectively.

The LED backlight module 100G3 shown in FIG. 35(a) may have a thickness of the light guide plate that decreases from the first side surface 171a toward the second side surface 171b in a similar manner as the LED backlight unit 100G1 of the LED backlight unit 100G shown in FIG. 34(c). The light guide plate 171 may include the light incidence part 172 provided in the lower end of the first side surface 171a to have the light incident thereon. The LEDs 173a of the light source has the structure making the light side-incident on the light incidence part 172 and the circuit board 173b having the LEDs arranged thereon may be provided horizontally under the light incidence part 172.

The light source may include the LEDs 173a arranged on the side of the light incidence part 172 and the circuit board 173b may be provided under the light incidence part 172. Since the light guide plate 171 has a thickness that decreases gradually, installation of the light guide plate 171 and the light source in the frame may be simple and the light guide plate 171 and the light source may be modulated by an auxiliary middle mold 180 and the lower cover 190.

The middle mold 180 may support the LEDs 173a and the upper surface of the light incidence part 172. The lower cover 190 may support predetermined portions of the circuit board 173b and the reflection plate 174 provided under the light incidence part 172.

The lower cover 190 may be recessed to accommodate the projected portion of the circuit board 173b and the projected portion of the lower surface of the lower cover 190 may be seated on the recess (g) of the frame.

The width of the recess (g) may be larger than the width of the circuit board 173b and a length of the recess (g) may be predetermined enough to simultaneously receive the plurality of circuit boards.

In case the plurality of circuit boards are seated in a single recess, the circuit boards forming each of the LED backlight module or the modules including the circuit board may be arranged continuously for both opposite ends of them to be adjacent to next opposite ends of neighboring ones.

That is, if the LED backlight module does not include the middle mold 180 or the lower cover 190, the circuit board 173b may be directly seated in the recess (g) of the frame. If the middle mold 180 and the lower cover 190 are used, the projected portion of the lower cover 190 may be seated in the recess (g) of the circuit board 173b.

As shown in FIG. 35(b), the LEDs 173a may be arranged on the circuit board 173b by being spaced apart from each other by a predetermined distance. The LEDs 173a may be mounted on the circuit board 173b in a state of being spaced apart along a longitudinal direction of the circuit board 173b. The LEDs 173a may be controlled or driven by a driving unit that includes a driving circuit or a power circuit mounted on a backside of the frame.

As a result, a cable (c) or a flexible printed circuit board (FPCB) may connect the light source to the driving unit. A connection terminal 173c may be provided opposite to the lower surface of the circuit as shown in FIG. 35(c). Each of FIGS. 34(a)-34(c) shows a driving circuit coupled to the cable (c).

The connection terminal 173c may be provided in the upper surface of the circuit board 173b and the driving unit may be provided in the frame backside to drive the light source. Thus, the connection terminal 173c may be provided in the lower surface of the circuit board 173b and it may connect the circuit board 173b to the driving unit via a connection hole (h) of the frame.

As a result, the connection terminal 173c may be positioned to correspond to the connection hole (h) formed in the frame.

The plural circuit boards having the LEDs 173a mounted thereon may be provided. It may be difficult to connect the circuit board to the driving circuit by detouring between the light guide plates without the connection hole (h) connecting the circuit boards and the driving circuit.

The LCD according to an example embodiment of the present invention may include a cable to electrically connect the circuit board forming each module to the driving unit via the connection hole (h).

If the connection terminal 173c is provided in or on the backside of the circuit board, a through hole (not shown) corresponding to the connection terminal 173c may be formed in the lower cover 190.

Figure 36:
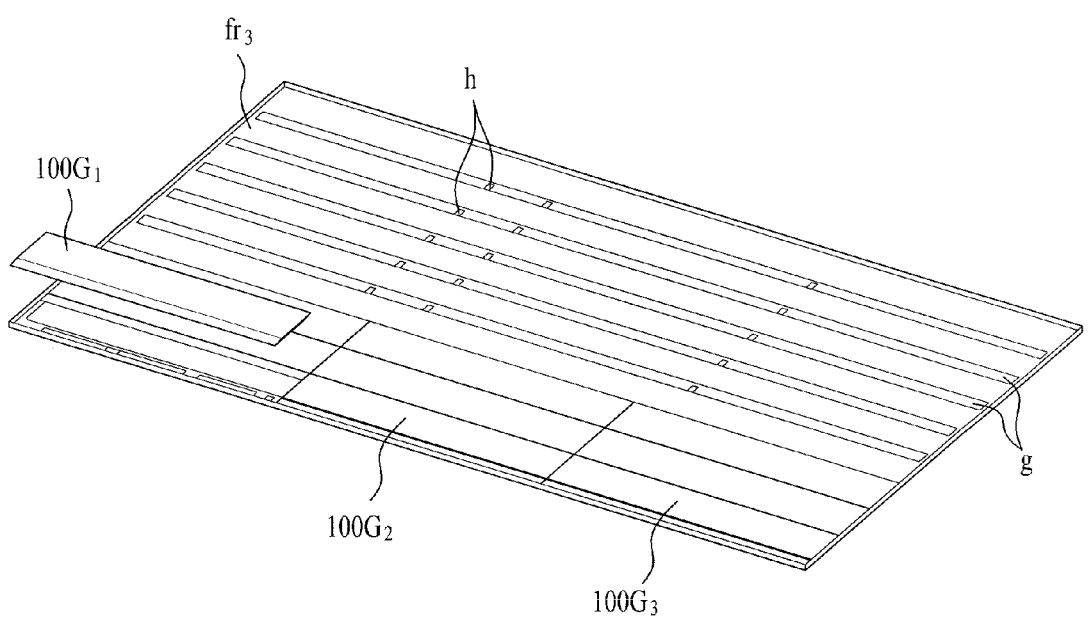
FIG. 36 is a plane view illustrating two examples of a frame that form the LCD.

FIG. 36 illustrates the LED backlight unit 100G or LED backlight module 100G3 to attach to the frame fr3 of the LCD.

The LED backlight unit 100G or each LED backlight module forming the LED backlight unit may be mounted to the frame fr3. For convenience sake, the LED backlight unit 100G or LED backlight modules may be mounted according to FIG. 34(a) or FIG. 34(c).

The frame may include a plurality of long recesses (g) spaced at predetermined intervals. The recesses (g) may receive the projected portion of the circuit board or the lower cover 190.

Accordingly, the position of the circuit board may correspond to the position of the recess (g). A single recess (g) may correspond to plural LED backlight modules. As shown in FIG. 36, a single recess (g) may have a predetermined length corresponding to an overall width of the frame and a predetermined number of the LED backlight modules corresponding to the overall width of the frame may be securely seated in the single recess (g).

As shown in FIGS. 34(a)-34(c), the plurality of connection holes (h) may be formed in the frame and may be used as connection passages to connect the circuit boards of the light sources to the driving unit provided on the backside of the frame.

If the recess (g) is formed in the frame by projecting the circuit board under the LED backlight unit 100G, the connection hole (h) may be formed in the recess (g). If the connection hole (h) is formed in the recess (g), the connection terminal 173c provided in the lower surface of the circuit board may be connected to the driving unit via the connection hole (h).

The connection terminal 173c of the circuit board 173b may be positioned such that the position of the circuit board 173b corresponds to the connection hole (h) of the frame (fr3). That is, the connection terminal 173c may be exposed through the connection hole (h) from the backside of the frame such that the connection terminal 173c may be smoothly connected to the driving unit formed in the backside of the frame. The connection terminal 173c of the circuit board 173b may thereby be connected to the driving unit of the frame via the cable (c).

A predetermined number of the connection holes (h) may correspond to each circuit board of the light sources or a plurality of circuit boards may be connected to the driving unit via a single connection hole (h).

As shown in FIG. 36, the LED backlight module is not limited to being horizontally installed and it may be vertically installed. In the case of vertical installment, the direction of the recess (g) may be vertical.

Figure 37A:
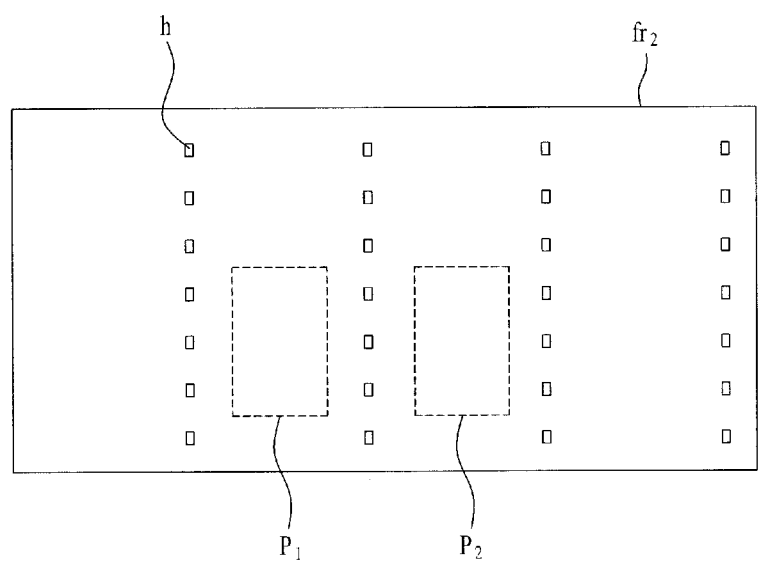
FIGS. 37($a$)-37($b$) illustrate the frame that forms the LCD.
Figure 37B:
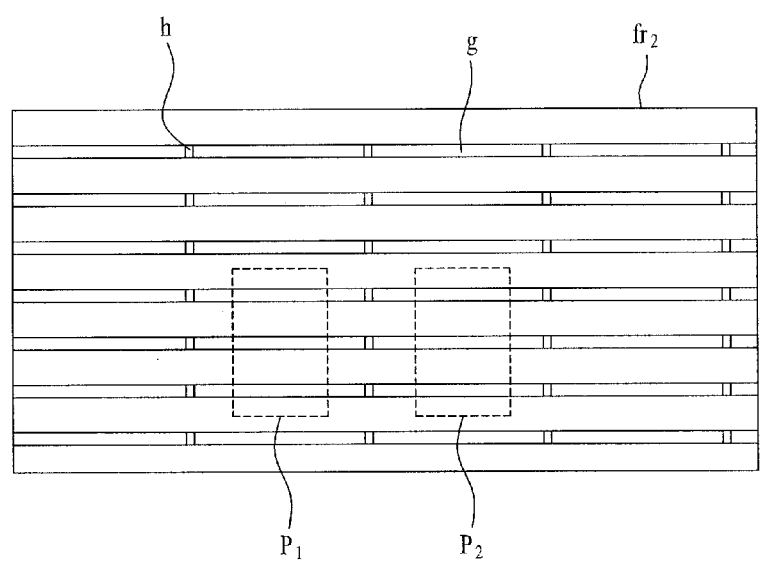

FIGS. 37(a)-37(b) are plane views illustrating the frame fr2 of the LCD. FIG. 37(a) illustrates the frame fr2 having only a plurality of connection holes (h) without the recess (g) receiving the circuit board. FIG. 37(b) illustrates a frame fr2 having a plurality of recesses (g) formed to correspond to a lower surface shape of the LED backlight unit 100G to receive the circuit board and the connection holes (h) formed in the recesses (g), respectively.

A plurality of driving units may be mounted to a backside of the frame shown in FIG. 37. The recesses (g) may be formed at a predetermined interval and can simultaneously receive the plural LED backlight modules of each LED backlight unit 100G. The recesses (g) formed in the frame may have a formation direction determined according to an installation direction of the LED backlight modules.

Because of the above described configuration for forming the recess (g) in the frame, positions of the LED backlight modules forming the LED backlight unit 100G may be efficiently determined and detachment caused by external shock applied to the fabricated product may be prevented.

Figure 38:
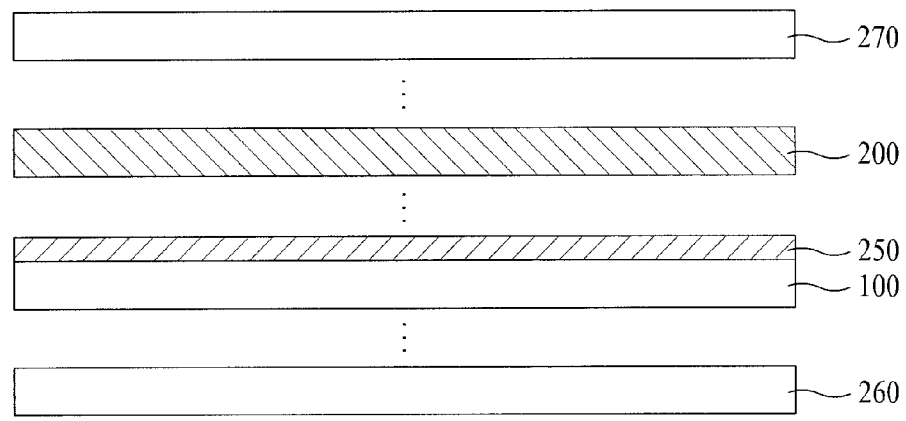
FIG. 38 is an exploded view illustrating a LCD including an LED backlight unit according to a eighth embodiment of the present invention.
Figure 39:
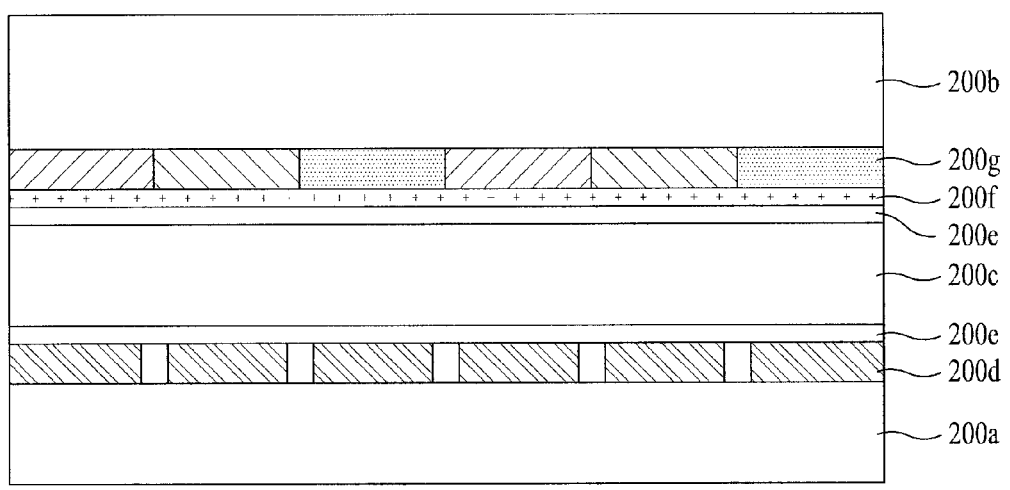
FIG. 39 is a sectional view illustrating a liquid crystal panel according to the eighth embodiment.

Referring to FIGS. 38 and 39, a liquid crystal display device 400 can be fabricated by using the backlight unit in accordance with one of the above-described first to seventh embodiments (reference numerals 100A to 100G may hereafter be shown with a reference numeral 100) and the liquid crystal display panel 200.

As shown in FIG. 38, the liquid crystal display panel 200 on the backlight unit 100 may include an upper substrate 200a, a lower substrate 200b and a liquid crystal layer 200c between the upper substrate 200a and the lower substrate 200b.

On one side of the liquid crystal display panel 200, a driver (not shown) may be provided for driving the liquid crystal display panel.

FIG. 38 shows a lower cover 260 under the backlight unit 100 that covers the backlight unit 100, and an upper cover 270 on the liquid crystal display panel 200 that covers a front of the liquid crystal display panel 200.

The liquid crystal display panel 200 may include a matrix of liquid crystal cells, for forming an image by controlling light transmission ratios of the liquid crystal cells according to information on an image signal from the driver.

The driver may include a flexible printed circuit board FPC, a driver chip mounted to the FPC, and a printed circuit board PCB connected to the other side of the FPC.

As shown in FIG. 38, the backlight unit 100 may be in rear of the liquid crystal display panel 200, and a plurality of optical sheets 250 may be provided on the backlight unit 100.

The optical sheets may be on a back side of the liquid crystal display panel 200, and may include a diffusion sheet 250a, a prism sheet 250b, and a protective sheet 250c as shown in FIG. 27.

The diffusion sheet 250a may diffuse the light from the backlight unit 100 and supply the light to the liquid crystal display panel 200.

The prism sheet 250b may have an array of triangular prisms on an upper side for covering the light diffused at the diffusion sheet in a direction perpendicular to a plane of the liquid crystal display panel 200 positioned over the prism sheet 250b.

The micro-prism on the prism sheet 250b may have a predefined angle. Most of the light passing through the prism sheet 250b proceeds perpendicular to the prism sheet 250b to provide a uniform luminance distribution.

The protective sheet 250c at the uppermost side may protect the prism sheet 250b which is susceptible to scratch.

Referring to FIG. 39, formed on the lower substrate 200a of the liquid crystal display panel 200, there are a matrix of gate lines and data lines, and a pixel electrode and a thin film transistor TFT 200d at every cross point of the gate lines and the data lines.

A signal voltage applied to the liquid crystal display panel 200 through the thin film transistor 200d may be supplied to the liquid crystal layer 200c by the pixel electrode, and the liquid crystal layer 200c may be aligned according to the signal voltage to fix a light transmission ratio.

Formed on the upper substrate 200b, a color filter 200g having R, G, B pixels may be provided for producing a pre-defined color as the light passes therethrough, and a common electrode 200f may be provided of a transparent conductive material, such as ITO (Indium Tin Oxide) or IZO (Indium Zinc Oxide).

Alignment films may be positioned on upper/lower sides of the liquid crystal layer 200c.

The liquid crystal display device may maximize a performance by using the backlight unit in accordance with one of the first to seventh embodiments.

<An Eighth Embodiment>

Figure 40:
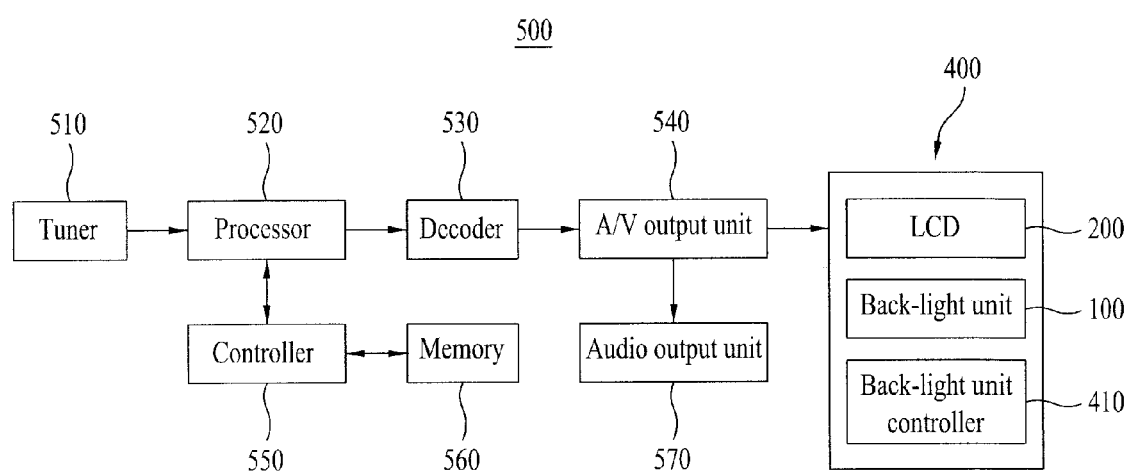
FIG. 40 is a block view illustrating LCD TV including the LCD according to the eighth embodiment.

FIG. 40 illustrates a block diagram of a liquid crystal TV set having a liquid crystal display device in accordance with an eighth preferred embodiment of the present invention.

The liquid crystal TV set may have a system for transmission and display of a broadcasting data stream from a tuner 510 to the liquid crystal display device 400 through a processor 520, a decoder 530, and an A/V output unit 540.

The tuner 510 or the processor 520 may be controlled by a controller 550, and the controller 550 may include a memory 560 (provided external or internal to the controller 550).

If a user selects and sets a broadcasting channel by operating the liquid crystal TV set 500, the controller 550 may control the tuner 510 and the processor 520, to select a broadcasting channel the user set thus, and the processor 520 may split the data stream of a broadcasting program provided through the broadcasting channel into an audio and video data, and forward the split audio and video data.

The decoder 530 may decode from the data the processor 520 into audio and video signals, for forwarding the audio and video signals to the liquid crystal display device 400 or an audio output unit 570 such as a speaker unit through the A/V output unit 540.

In this instance, the backlight unit 100 may be driven by a backlight unit controller 410 for illuminating an image forwarded to the liquid crystal display panel (LCD) 200.

The processor 520 may receive the broadcasting data stream through the Internet.

Thus, the backlight unit 100, the liquid crystal display device 400 (with the backlight unit 100) and the liquid crystal TV set 500.

In the backlight unit 100 of embodiments of the present invention, an upper side width of the light incidence part may be smaller than a lower side width of the light incidence part, shifting a light path of the light reflected totally, to increase a light quantity of the light forwarded upward from the light guide plate.

The arrangement of the LEDs at a side of the light guide plate may reduce a total thickness of the backlight unit, thereby enabling to reduce a display panel, such as the LCD.

Fabricating the backlight unit having the light guide plate and the LEDs coupled thereto as a module, and assembling a plurality of the modules by connecting the modules in a tiling fashion may provide a backlight unit suitable for a large sized display device.

The fastening hook and fastening member on the reflection plate of the backlight unit fabricated as the module may permit easy and simple assembly, not only with an adjacent backlight unit, but also with a back cover of the backlight unit.

The projection on the light guide plate to form an air layer gap between the light guide plate and the optical sheet may reduce an optical unevenness taking place at a boundary of adjacent light guide plates.

The formation of fastening members at the light guide plate modules may permit easy and simple assembly with an adjacent module, as well as with the frame.

The applicability of the local dimming in which the light source is driven partially according to an image permits to produce an image of a high contrast ratio.

A portion of the boundary of the adjacent modules can be made to be coupled optically, and an extent of the optical coupling of the modules can be adjusted. By adjusting or regulating the extent of the optical coupling, a relatively bright line or a dark line on light forwarding surface or on an interconnected part between adjacent modules can be prevented or reduced.

According to this, in case the backlight unit is fabricated by connecting the plurality of modules side by side, a substantially uniform light can be formed by decreasing optical singular point at the interconnected part.

Any reference in this specification to "one embodiment," "an embodiment,""example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display (LCD) comprising:
a plurality of modules, each module including a circuit board, a plurality of light emitting diode (LED) light sources arranged on the circuit board for emitting light, and a light guide plate having a light incidence part including an incident surface for receiving light emitted from the LED light source and a light emission part for emitting the light;
a frame having the plurality of the modules provided thereon; and
at least one driving unit on one surface of the frame,
wherein a connection hole is formed in the frame to connect the circuit board to the at least one driving unit,
wherein the light incident part projects from a first edge of the light guide plate in a side direction, wherein the light guide plate has a first light coupling surface on the first edge, and the light guide plate has a second light coupling surface on a second edge of the light input guide plate, and wherein the first edge of the light guide plate is opposite the second edge of the light guide plate.

2. The LCD of claim 1, wherein the plurality of modules comprises a first module and a second module arranged adjacent to each other.

3. The LCD of claim 1, further comprising a connection terminal provided on the circuit board, and wherein the connection terminal is positioned to correspond to the connection hole formed in the frame.

4. The LCD of claim 3, wherein the connection terminal is provided on an opposite side of the circuit board as the LED light sources.

5. The LCD of claim 1, further comprising:
a cable to connect the circuit board to the driving unit via the connection hole.

6. The LCD of claim 1, further comprising:
a flexible circuit board to connect the circuit board to the driving unit via the connection hole.

7. The LCD of claim 1, wherein the light guide plate comprises a raised portion formed by a height difference between an upper surface of the light incidence part and an upper surface of the light emission part.

8. The LCD of claim 7, wherein a thickness of the light incidence part is identical to or less than a thickness of the raised portion.

9. The LCD of claim 7, wherein a thickness of the raised portion is identical to or greater than a thickness of an end portion of the light emission part.

10. The LCD of claim 1, wherein a thickness of the light source is identical to or less than a thickness of the light incidence part.

11. A liquid crystal display (LCD) comprising:
a plurality of modules, each module including a circuit board, a plurality of LED light sources arranged on the circuit board for emitting light, and a light guide plate having a light incidence part including an incident surface for receiving light emitted from the LED light source and a light emission part for emitting the light;
a frame having the plurality of the modules arranged thereon;
at least one driving unit arranged on one surface of the frame,
wherein a plurality of connection holes is formed in the frame for electrically connecting the circuit board to the driving unit and a plurality of recesses is formed in the frame for providing the circuit board therein,
wherein the light incident part projects from a first edge of the light guide plate in a side direction, wherein the light guide plate has a first light coupling surface on the first edge, and the light guide plate has a second light coupling surface on a second edge of the light input guide plate, and wherein the first edge of the light guide plate is opposite the second edge of the light guide plate.

12. The LCD of claim 11, wherein the plurality of connection holes formed in the frame is formed in the plurality of recesses.

13. The LCD of claim 11, wherein the recess has a length larger than a width, and the plurality of the recesses is formed in parallel and are spaced apart from each other by a predetermined interval.

14. The LCD of claim 13, wherein a plurality of the circuit boards is provided in one recess that extends in a longitudinal direction.

15. The LCD of claim 14, wherein the plurality of circuit boards provided in the one recess is continuously arranged such that both ends of neighboring two circuit boards are adjacent thereto.

16. The LCD of claim 11, further comprising:
a cable to connect the circuit board to the driving unit via one of the connection holes.

17. The LCD of claim 11, further comprising:
a flexible circuit board to connect the circuit board to the driving unit via one of the connection holes.

18. The LCD of claim 11, wherein the LED light source is adjacent to a side of the light incidence part of the light guide plate and the LED light source is directly mounted on the circuit board arranged horizontally.

19. The LCD of claim 11, wherein the plurality of modules comprises a first module and a second module arranged adjacent to each other, wherein the first module comprises:
a first circuit board;
a plurality of LED light sources arranged on the first circuit board for emitting light; and
a first light guide plate having a light incidence part including an incident surface for receiving light emitted from the LED light source and a light emission part for emitting the light, and wherein the second module comprises:
a second circuit board;
a plurality of LED light sources arranged on the second circuit board for emitting light; and
a second light guide plate having a light incidence part including an incident surface for receiving light emitted from the LED light source and a light emission part for emitting the light, and
wherein a predetermined portion of the light emission part of the first light guide plate of the first module overlaps an upper surface of the light incidence part of the second light guide plate of the second module.

20. The LCD of claim 11, wherein the light guide plate includes a raised portion formed by a height difference between an upper surface of the light incidence part and an upper surface of the light emission part.

21. The LCD of claim 20, wherein a thickness of the light incidence part is identical to or less than a thickness of the raised portion.

22. The LCD of claim 20, wherein a thickness of the raised portion is identical to or greater than a thickness of an end portion of the light emission part.

23. The LCD of claim 11, wherein a thickness of the light source is identical to or less than a thickness of the light incidence part.

24. The LCD of claim 2, wherein the first module comprises:
a first circuit board;
a plurality of LED light sources arranged on the first circuit board for emitting light; and
a first light guide plate having a light incidence part including an incident surface for receiving light emitted from the LED light source and a light emission part for emitting the light.

25. The LCD of claim 24, wherein the second module comprises:
a second circuit board;
a plurality of LED light sources arranged on the second circuit board for emitting light; and
a second light guide plate having a light incidence part including an incident surface for receiving light emitted from the LED light source and a light emission part for emitting the light.

26. The LCD of claim 25, wherein a predetermined portion of the light emission part of the first light guide plate of the first module overlaps an upper surface of the light incidence part of the second light guide plate of the second module.

27. The LCD of claim 1, wherein a surface area of the first light coupling surface is different from a surface area of the second light coupling surface.

28. The LCD of claim 1, wherein a surface area of the first light coupling surface is substantially larger than a surface area of the second light coupling surface.

29. The LCD of claim 11, wherein a surface area of the first light coupling surface is different from a surface area of the second light coupling surface.

30. The LCD of claim 11, wherein a surface area of the first light coupling surface is substantially larger than a surface area of the second light coupling surface.

* * * * *